US012347592B2

(12) United States Patent
Zakotnik

(10) Patent No.: US 12,347,592 B2
(45) **Date of Patent: *Jul. 1, 2025**

(54) GRAIN BOUNDARY ENGINEERING OF SINTERED MAGNETIC ALLOYS AND THE COMPOSITIONS DERIVED THEREFROM

(71) Applicant: Noveon Magnetics Inc., Perryville, MD (US)

(72) Inventor: Miha Zakotnik, Austin, TX (US)

(73) Assignee: NOVEON MAGNETICS INC., Perryville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,799

(22) Filed: Feb. 21, 2024

(65) Prior Publication Data

US 2024/0194381 A1 Jun. 13, 2024

Related U.S. Application Data

(60) Continuation of application No. 18/069,321, filed on Dec. 21, 2022, now Pat. No. 11,942,245, which is a (Continued)

(51) Int. Cl.
*H01F 1/057* (2006.01)
*B22F 1/052* (2022.01)
(Continued)

(52) U.S. Cl.
CPC ............ *H01F 1/0577* (2013.01); *B22F 1/052* (2022.01); *B22F 1/17* (2022.01); *B22F 3/1035* (2013.01);
(Continued)

(58) Field of Classification Search
CPC .................................................... H01F 1/0577
See application file for complete search history.

(56) References Cited

U.S. PATENT DOCUMENTS

| | | | |
|---|---|---|---|
| 3,802,935 | A | 4/1974 | Martin et al. |
| 2004/0231751 | A1 | 11/2004 | Kuniyoshi et al. |

(Continued)

FOREIGN PATENT DOCUMENTS

| | | | |
|---|---|---|---|
| CN | 101026034 | B | 5/2010 |
| CN | 102211192 | A | 10/2011 |

(Continued)

OTHER PUBLICATIONS

Firdaus et al., "Review of High-Temperature Recovery of Rare Earth (Nd/Dy) from Magnet Waste",Journal of Sustainable Metallurgy, vol. 2, No. 4, Mar. 14, 2016 (Mar. 14, 2016), pp. 276-295.

(Continued)

*Primary Examiner* — Christopher S Kessler
(74) *Attorney, Agent, or Firm* — BakerHostetler

(57) ABSTRACT

The present disclosure is directed to methods of preparing permanent magnets having improved coercivity and remanence, the method comprising: (a) homogenizing a first population of particles of a first GBM alloy with a second population of particles of a second alloy to form a composite alloy preform, the first GBM alloy being represented by the formula: $AC_bR_xCo_yCu_dM_z$, the second alloy being represented by the formula $G_2Fe_{14}B$, where AC, R, M, G, b, x, y, and z are defined; (b) heating the composite alloy preform particles to form mixed alloy particles; (c) compressing the mixed alloy particles, under a magnetic field of a suitable strength to align the magnetic particles with a common direction of magnetization and inert atmosphere, to form a green body; (d) sintering the green body; and (e) annealing the sintered body. Embodiments include magnets comprising neodymium-iron-boron core alloys, including $Nd_2Fe_{14}B$.

21 Claims, 5 Drawing Sheets

Related U.S. Application Data division of application No. 16/073,521, filed as application No. PCT/US2017/014488 on Jan. 23, 2017, now Pat. No. 11,557,411.

(60) Provisional application No. 62/324,501, filed on Apr. 19, 2016, provisional application No. 62/288,243, filed on Jan. 28, 2016.

(51) Int. Cl.

| | |
|---|---|
| ***B22F 1/17*** | (2022.01) |
| ***B22F 3/10*** | (2006.01) |
| ***B22F 3/24*** | (2006.01) |
| ***B22F 5/00*** | (2006.01) |
| ***B22F 9/04*** | (2006.01) |
| ***C22C 33/02*** | (2006.01) |
| ***C22C 38/00*** | (2006.01) |
| *B22F 1/054* | (2022.01) |
| *B22F 9/06* | (2006.01) |
| *H01F 41/02* | (2006.01) |

(52) U.S. Cl.

CPC .................. *B22F 3/24* (2013.01); *B22F 5/00* (2013.01); *B22F 9/04* (2013.01); *C22C 33/02* (2013.01); *C22C 33/0207* (2013.01); *C22C 38/00* (2013.01); *B22F 1/054* (2022.01); *B22F 1/056* (2022.01); *B22F 2003/248* (2013.01); *B22F 2009/044* (2013.01); *B22F 9/06* (2013.01); *B22F 2201/013* (2013.01); *B22F 2201/20* (2013.01); *B22F 2202/05* (2013.01); *B22F 2207/07* (2013.01); *B22F 2998/10* (2013.01); *B22F 2999/00* (2013.01); *C22C 2202/02* (2013.01); *H01F 41/0293* (2013.01)

(56) References Cited

U.S. PATENT DOCUMENTS

| | | | |
|---|---|---|---|
| 2007/0034299 A1 | 2/2007 | Machida et al. |
| 2009/0019969 A1 | 1/2009 | Kato et al. |
| 2011/0052799 A1 | 3/2011 | Nagata et al. |
| 2014/0066687 A1 | 3/2014 | Munro, III |
| 2014/0366687 A1 | 12/2014 | Zakotnik et al. |
| 2016/0086701 A1 | 3/2016 | Miwa et al. |
| 2016/0180993 A1 | 6/2016 | Kanada et al. |

FOREIGN PATENT DOCUMENTS

| | | | |
|---|---|---|---|
| CN | 101266855 B | 5/2012 |
| CN | 102453804 A | 5/2012 |
| CN | 103117143 A | 5/2013 |
| DE | 19843883 C1 | 10/1999 |
| GB | 2487656 A | 8/2012 |
| JP | 2004-296793 A | 10/2004 |
| WO | 2004/029996 A1 | 4/2004 |
| WO | 2014/205002 A2 | 12/2014 |
| WO | 2015/002280 A1 | 1/2015 |
| WO | 2015/020183 A1 | 2/2015 |

OTHER PUBLICATIONS

International Preliminary Report on Patentability received for PCT Patent Application No. PCT/US2017/014488, mailed on Aug. 9, 2018, 16 pages.
International Search Report and Written Opinion received for PCT Patent Application No. PCT/US2017/014488, mailed on Apr. 20, 2017, 18 pages.
Kawasaki et al., "Reproduction of Nd—Fe—B Sintered Magnet Scraps Using a Binary Alloy Blending Technique", Materials Transactions, 2003, vol. 44, No. 9, 1682-1685.
Li et al., "Waste Nd—Fe—B Sintered Magnet Recycling by Doping With Rare Earth Rich Alloys", IEEE Transactions on Magnetics, vol. 50, No. 12, Dec. 2014, 3 pages.
Merrow, "Estimating Startup Times for Solids-Processing Plants", Chemical Engineering, Oct. 1988, 89-92.
Uestuener et al., "Dependence of the Mean Grain Size and Coercivity of Sintered Nd—Fe—B Magnets on the Initial Powder Particle Size", IEEE Transactions on Magnetics, Oct. 2006, vol. 42, No. 10, 2897-2899.
Zakotnik et al., "Commercial-scale recycling of NdFeB-type magnets with grain boundary modification yields products with 'designer properties' that exceed those of starting materials", Waste Management., vol. 44, Oct. 1, 2015 (Oct. 1, 2015), pp. 48-54.
Zakotnik et al., "Multiple recycling of NdFeB-type sintered magnets", Journal of Alloys and Compounds, 2009, 469, 314-321.
Zakotnik et al., "Possible methods of recycling NdFeB-type sintered magnets using the HD/degassing process", Journal of Alloys and Compounds, 2008, 450, 525-531.

GRAIN BOUNDARY ENGINEERING OF SINTERED MAGNETIC ALLOYS AND THE COMPOSITIONS DERIVED THEREFROM

CROSS REFERENCE TO RELATED APPLICATIONS

This application is a continuation of U.S. patent application Ser. No. 18/069,321 filed Dec. 21, 2022, which is a divisional of U.S. patent application Ser. No. 16/073,521, filed Jul. 27, 2018, now U.S. Pat. No. 11,557,411 which issued Jan. 17, 2023, which is the National State of International Application No. PCT/US2017/014488, filed Jan. 23, 2017, which claims the benefit of and priority to U.S. Provisional Application Nos. 62/288,243, filed Jan. 28, 2016 and 62/324,501, filed Apr. 19, 2016, the contents of which are all incorporated by reference herein for all purposes.

TECHNICAL FIELD

The present disclosure is directed at methods of preparing rare earth-based permanent magnets and the magnets arising from these methods having improved magnetic properties. Particular embodiments include alloys comprising neodymium-iron-boron magnets, including grain boundary engineered $Nd_2Fe_{14}B$ magnets.

BACKGROUND

Neodymium, Iron, Boron (NdFeB) magnets were first developed in the early 1980s and are now among the most important permanent magnetic materials currently in production. These magnets are used in a wide range of applications, such as MRI machines, hard disk drives, loudspeakers, linear motors, A/C motors, wind turbines, hybrid electric vehicles, elevator motors, and mobile phones and other consumer electronics. But the supply of rare earth elements, in particular dysprosium (Dy) and terbium (Tb) which are required for increased magnetic performance, is scarce. World demand for these elements often exceeds the supply, particularly as many mines are located in China where export quotas impede the free trade of these elements and drive up their prices. This limited supply of rare earth elements is a concern for the industries of many developed economies. Approximately 40% of sintered magnets are currently supplied for use in the automotive industry where they are incorporated into hybrid electric motors as magnetic segments, each of which weighs ~100-200 grams or more. It is thus desirable to manufacture NdFeB magnets, and other rare earth-containing magnets, with a minimal concentration of heavy rare earths (e.g., Dy and Tb), yet which are suitable for use in electric motors.

Conventional production of NdFeB materials requires a high concentration of Dy or Tb elements to form the highly coercive sintered NdFeB magnet bodies that are able to operate at high temperatures. This conventional method of modifying properties has associated high material and processing costs.

Processes are known whereby two alloys are combined to produce a magnetic body using powder blending techniques. But such processes typically have high associated production cost for manufacturing two similar alloys which both contain Dy. Quality control is also difficult because of inconsistent mixing of multiple individual powders. Other attempts to increase the loading of Dy in the NdFeB magnets use various methods to paste, sputter or coat the surface of the magnet body with a material containing high concentrations of Dy, Tb or other heavy elements to a pre-sintered rare earth magnet. During the subsequent heating steps these heavy elements diffuse into the magnet body from one side/edge of the body through the grain boundaries and alter the properties of the magnet; increasing coercivity without affecting remanence. This process is said to reduce the amount of Dy or Tb required to create a high coercivity magnet suitable for motor applications. However, such grain boundary diffusion is limited to magnets with a body not exceeding 6 mm in thickness and requires additional post processing steps and complex and expensive machinery to execute successfully. In addition, such diffusion processes limit the extent to which coercivity can be increased; typically only a 30-40% increase in coercivity is achieved using this process.

The present disclosure is directed to solving at least some of these problems.

SUMMARY

The present disclosure describes a method of making useful rare earth magnets operable at high temperatures, and the magnets thereby produced.

Certain embodiments provide methods of preparing a sintered magnetic body having improved coercivity and remanence, each method comprising:

(a) homogenizing a first population of particles of a first Grain Boundary Modifying (GBM) alloy with a second population of particles of a second core alloy, the weight ratio of the first and second population of particles is in a range of from about 0.1:99.9 to about 16.5:83.5 to form a composite alloy preform; wherein
 the second core alloy is substantially represented by the formula $G_2Fe_{14}B$, where G is a rare earth element; optionally, the second core alloy is doped with one or more transition metal or main group element (so as to allow the use of either virgin or recycled materials);
 the mean particle diameter of the first population of particles of the first GBM alloy is in a range of from about 1 micron to about 4 microns;
 the mean particle diameter of the second population of particles of the second core alloy is in a range of from about 2 microns to about 5 microns; and (b) heating the composite alloy preform to a temperature greater than the solidus temperature of the first alloy but less than the melting temperature of the second core alloy to form a population of discrete mixed alloy particles. In some embodiments, the mixed alloy particles may be characterized as the second core alloy particles comprising a first GBM alloy coating, either as a particulate coating (i.e., in the composite alloy preform) or continuous or semi-continuous (i.e., in the discrete mixed alloy particles) coating.

In other embodiments, the homogenizing step (a) is preceded by treating coarse particles of either the first GBM or second core alloy or both the first GBM and second core alloys with hydrogen gas under conditions and for a time sufficient to allow absorption of the hydrogen into either or both of the alloys. This hydrogen treatment step may be followed by an outgassing treatment step.

In still other embodiments, the methods further comprise: (c) compressing the population of mixed alloy particles together to form a green body, in the presence of a magnetic field of a suitable strength to align the magnetic particles with a common direction of magnetization, preferably in an inert atmosphere.

Additional embodiments include those methods further comprising (d) heating the green body to at least one temperature in a range of from about 800° C. to about 1500° C. for a time sufficient to sinter the green body into a sintered body comprising sintered core shell particles and a grain boundary composition.

In still other embodiments, the methods further comprise (e) heat treating (or annealing) the sintered body in an environment of cycling vacuum and inert gas. In some of these embodiments, the temperature of the cycling environment is in the range of from about 450° C. to about 600° C.

In other embodiments, during and/or after sintering and/or during or after annealing, (f) the sintering/sintered body is magnetized by applying a magnetic field of sufficient strength to achieve final remanence and coercivity as described herein, for example, using a magnetic field in a range of from about 400 kA/m to about 1200 kA/m (0.5 to 1.5 T).

In some of these embodiments, the first GBM alloy is substantially represented by the formula $AC_bR_xCo_yCu_dM_z$, present either by itself or as a coating on the second core alloy particles where:

(A) AC comprises Nd and Pr in an atomic ratio in a range of from 0:100 to 100:0, and b is a value in a range of from about 5 atom % to about 65 atom %;

(B) R is one or more rare earth elements and x is a value in a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 atom % to about 18 atom %; and (G) b, x, y, d, and z are independently variable within their stated ranges provided that the sum of b+x+y+d+z is greater than 95, 96, 97, 98, 99, 99.5, 99.8, or 99.9 atom % to about 99.9 atom % or 100 atom %.

In some other of these embodiments, the first GBM alloy is substantially represented by the formula $Nd_jDy_kCo_mCu_nFe_p$, where j is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition;

k is atomic percent in a range from 1 to 5, 5 to 10, 10 to 15, 15 to 20, 20 to 25, 25 to 30, 30 to 35, 35 to 40, 40 to 45, 45 to 50, 50 to 55, 55 to 60 atom % or a range comprising two or more of these ranges, relative to the entire composition;

m is atomic percent in a range from 1 to 5, 5 to 10, 10 to 15, 15 to 20, 20 to 25, 25 to 30, 30 to 35, 35 to 40, 40 to 45, 45 to 50, 50 to 55, 55 to 60 atom % or a range comprising two or more of these ranges, relative to the entire composition;

n is atomic percent in a range from 0.1 to 0.5, 0.5 to 1, 1 to 1.5, 1.5 to 2, 2 to 2.5, 2.5 to 3, 3 to 3.5, 3.5 to 4, 4 to 4.5, 4.5 to 5, 5 to 5.5, 5.5 to 6, 6 to 6.5, 6.5 to 7, 7 to 7.5, 7.5 to 8, 8.5 to 9, 9 to 9.5, 9.5 to 10, 10 to 12, 12 to 14, 14 to 16, 16 to 18, 18 to 20 atom % or a range comprising two or more of these ranges, relative to the entire composition;

p is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition; and j, k, m, n, and p are independently variable within their stated ranges provided that the sum of j+k+m+n+p is greater than 95, 96, 97, 98, 99, 99.5, 99.8, or 99.9 atom % to about 99.9 atom % or 100 atom %.

The disclosure is not limited to methods of processing, and in some embodiments provide for the particles, green bodies, or sintered bodies prepared by the disclosed methods, as well as articles and devices comprising these sintered bodies.

Still other embodiments provide compositions comprising a GBM alloy, wherein this alloy is substantially represented by the formula: $AC_bR_xCo_yCu_dM_z$, wherein:

(A) AC comprises Nd and Pr in an atomic ratio in a range of from 0:100 to 100:0, and b is a value in a range of from about 5 atom % to about 65 atom % or from 10 atom % to about 50 atom %;

(B) R is one or more rare earth element and x is a value in a range of from about 10 atom % to about 60 atom %;

(C) Co is cobalt and Cu is copper;

(D) y is a value in a range of from about 30 atom % to about 40 atom %;

(E) d is a value in a range of from about 0.01 atom % to about 6 atom %;

(F) M is at least one transition metal element, exclusive of Cu and Co, and z is a value in a range of from about 0.01 atom % to about 10 atom %; and (G) the sum of b+x+y+d+z is greater than one or more of 95, 96, 97, 98, 99, 99.5, 99.8, or 99.9 atom % and no greater than 100 atom %; and wherein the composition contains less than 0.1 wt % oxygen or carbon.

The GBM alloy may comprise one or more phases that are amorphous or in a form containing columnar and globulite crystals.

The disclosure also describes an apparatus for mixing particles, the apparatus comprising:

(a) an insulated rotatable reactor, said reactor having inlet and outlet ports, each port adapted for respectively adding and removing particles from the rotatable reactor, each inlet and outlet port optionally fitted with a particle sieve;

(b) a vacuum source capable of providing vacuum to the insulated rotatable reactor (c) a heater capable of heating the rotatable reactor during use; and optionally (d) a sampling portal allowing for retrieval of samples during the operation of the apparatus.

The disclosure also provides a system for processing the inventive method and compositions; the system comprising the apparatus for mixing particles and further comprises one or more of:

(a) a rotatable hydrogen reactor capable of treating magnetic materials with hydrogen at pressures in a range of from about 1 to about 10 bar (or in some circumstances, higher);

(b) a rotatable outgassing chamber capable of being evacuated and heated to outgas hydrogen-containing magnetic materials;

(c) a jet milling apparatus;

(d) a compression device capable of applying a force in a range of from about 800 to about 3000 kN (per 20 $cm^2$, or 60 MPa) to a population of particles, the compression device fitted with a source of a magnetic field capable of providing a magnetic field in a range of from about 0.2 T to about 2.5 T, while the compression device is applying the pressure to the population of particles; and (e) a sintering chamber configured to provide alternative vacuum and inert atmosphere environments within the chamber while providing an internal temperature to the chamber in a range of from about 400° C. to 1200° C. In separate embodiments, the system comprises any 2, 3, 4, or 5 of the elements (a) to (e).

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, while each represents an embodiment of the present disclosure, the presently disclosed subject matter is not limited to the specific methods, devices, and systems disclosed. In addition, the drawings are not necessarily drawn to scale. In the drawings:

In FIG. 4A, the weight ratio is S1 (97.7):A2 (2.3). See Table 2. In FIG. 4B, the weight ratio is S1 (97.2):A1 (2.8).

DETAILED DESCRIPTION OF ILLUSTRATIVE EMBODIMENTS

Figure 1:
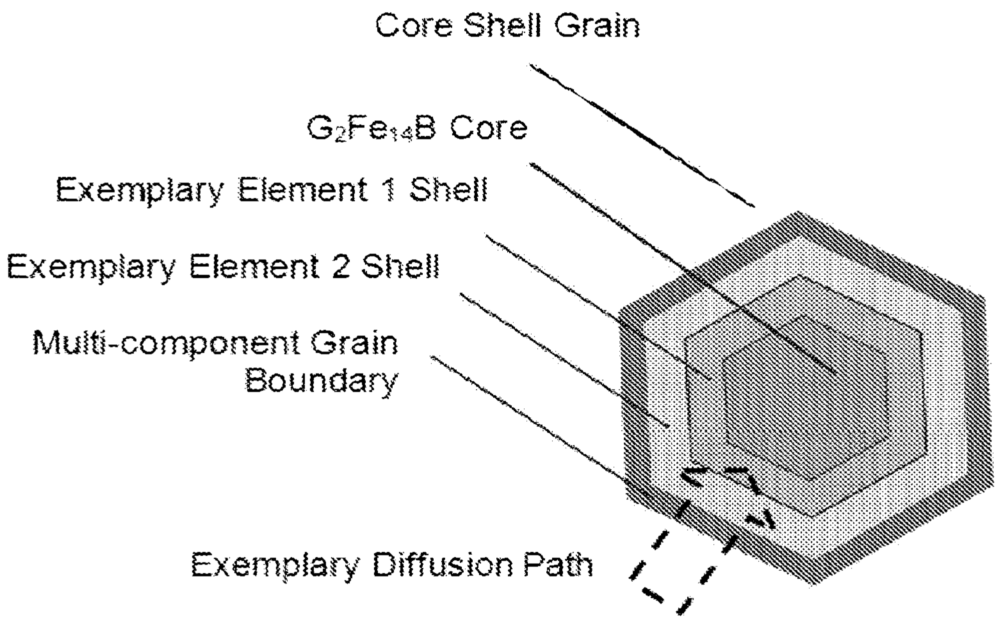
FIG. 1 shows a theorized schematic of one embodiment of a GBE-NdFeB based microstructure, containing the multiple shells surrounding a $G_2Fe_{14}B$ based hard magnetic phase, where G is a rare earth element, for example Nd.

The present invention is directed to methods or processes for processing magnetic materials and compositions resulting from these processes. In some embodiments, a first GBM alloy is used to modify a second core alloy. In some embodiments, the steps for accomplishing this includes reducing the size of the first GBM and second core particles to specific dimensions, the sizes being suitable for coating (or more generally admixed) micro-grains of the second core (magnetic) alloy with particles of a first GBM alloy. Subsequent steps comprising powder metallurgy and heat treatments provide conditions in which the elements of the first GBM alloy are allowed to diffuse into the grains of the second core alloy, providing a core shell structure, the core comprising and retaining a hard magnetic phase of the second core alloy. Magnetization and further heat treatments post sintering allow for additional control of the magnetic character of the resulting sintered bodies. Using the methods described herein, it is possible to prepare high energy rare earth magnets, including GBE-NdFeB magnets that have high, uniform coercivity that are resistant to demagnetizing fields and corrosion, with improved thermal stability, whilst using low levels of expensive rare elements in their manufacture.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism, mode, or theory of action or reason for improvement is meant to be illustrative only, and the invention herein is not to be constrained by the correctness or incorrectness of any such suggested mechanism, mode, or theory of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim in one context is intended to extend these features or embodiment to embodiments in every other of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others. For example, in the method steps (a) through (f) described herein, each of steps (a), (b), (c), (d), (e), (f), and any combination of two or more of these steps are considered separate embodiments of this disclosure.

Any theory or means of action is intended to be illustrative of concepts or help visualize certain aspects of the invention(s) only and cannot necessarily be known to occur with any particular certainty. So, while used to help with understanding, it is to be appreciated, that the invention(s) does not necessarily depend on the correctness of any particular theory of operability described herein.

The transitional terms “comprising,” “consisting essentially of,” and “consisting” are intended to connote their generally in accepted meanings in the patent vernacular; that is, (i) “comprising,” which is synonymous with “including,” “containing,” or “characterized by,” is inclusive or open-ended and does not exclude additional, unrecited elements or method steps; (ii) “consisting of” excludes any element, step, or ingredient not specified in the claim; and (iii) “consisting essentially of” limits the scope of a claim to the specified materials or steps “and those that do not materially affect the basic and novel characteristic(s)” of the claimed invention. Embodiments described in terms of the phrase “comprising” (or its equivalents), also provide, as embodiments, those which are independently described in terms of “consisting of” and “consisting essentially of” For those embodiments provided in terms of “consisting essentially of,” the basic and novel characteristic(s) is the ability to prepare the inventive magnetic materials (or the magnetic materials themselves) using or comprising the materials described in those embodiments, yet allowing for the optional presence of impurities or other additives that have little or no additional or adverse effect on the magnetic properties of the resulting materials.

When a list is presented, unless stated otherwise, it is to be understood that each individual element of that list, and every combination of that list, is a separate embodiment. For example, a list of embodiments presented as “A, B, or C” is to be interpreted as including the embodiments, “A,” “B,” “C,” “A or B,” “A or C,” “B or C,” or “A, B, or C.” Additionally, where a broad genus (or list of elements within that genus) is described, it is to be understood that separate embodiments also provide for the specific exclusion of one or more elements of that genus. For example, the reference to the genus “rare earth elements” not only includes any individual or combination of two or more elements within that genus (including, e.g., La, Ce, Pr, Nd, Pm, Sm, Eu, Gd, Tb, Dy, Ho, Er, Tm, Yb, and Lu), but also includes, as specific embodiments, the general genus exclusive of one or more of the elements of that genus (e.g., Sm), even if each member of the genus is not specifically recited as excluded.

Throughout this specification, words are to be afforded their normal meaning, as would be understood by those skilled in the relevant art. However, so as to avoid misunderstanding, the meanings of certain terms will be specifically defined or clarified.

As used herein, the term “NdFeB” refers to a composition comprising neodymium, iron, and boron, at least a portion of this being of the stoichiometry $Nd_2Fe_{14}B$. In the same way, the term “GBE-NdFeB” refers to a composition of comprising $Nd_2Fe_{14}B$ (or “NdFeB”) which have been prepared by so-called Grain Boundary Engineering (“GBE”) to incorporate Grain Boundary Modifiers (“GBMs”) so as to provide “Grain Boundary Engineered compositions” (“GBE compositions”). In the present context, GBE or Grain Boundary Engineering refers to a process by which particles comprising NdFeB, and structures prepared from such particles, reacted with particulate alloys, described as Grain Boundary Modifier (or Modifying) alloys (or “GBM alloys”) such that when sintered together, the particular metals associated with the particulate alloys migrate into the bodies of the NdFeB particles, while forming a matrix for the grains, to form “GBE magnets” (“Grain Boundary Engineered magnets”). This migration of the GBM alloy metals into the NdFeB particles result in core-shell structures, where the resulting core shell particles may be characterized, for example, as depicted in FIG. 1; that is, comprising a core of the original $Nd_2Fe_{14}B$ particle, and gradients of the various alloy metals distributed through the core-shell particle. These concepts are described more fully elsewhere in this description.

Because the terms “GBM” and “GBE” refer to the same principles of modifying grain boundaries of sintered bodies, any substitution of one term by the other should not be construed as a significant difference in meaning.

As used herein, the term “homogenizing” refers to a process of mixing under conditions suitable for preparing a uniform distribution of particles, resulting in a composition that is “substantially homogeneous.” The process of homogenizing also results in the attrition of some or all of the particles. While perfect uniformity (i.e., pure homogeneity) may be a desirable goal, the term “homogenizing” does not necessarily result in such perfect uniformity. A resulting composition may be considered “substantially homogeneous,” to reflect the practical considerations of mixing powders, if at least three samples are taken and tested, for example by ICP, and the results of the three analyses are within some predetermined target precision range (e.g., standard deviation of material measurements less than 5, 3, 2, 1, 0.5, or 0.1%, preferably less than 0.5 or 0.1%%, relative to the mean) or within 0.1% to 0.5% of the target value for the component.

As used herein, the term “solidus temperature” confers its ordinary meaning of the temperature below which the substance is completely solid (crystallized).

The term “substantially represented by the formula” X refers to an alloy having a nominal formula X, but allowing for the presence of minor levels of impurities or deliberately added dopants.

The term “mixed alloy,” as in “mixed alloy particle,” refers to a composition in which the second core alloy particle is in contact with, and preferably at least partially coated with, particles of the first GBM alloy. Depending on the heat treatment experienced by the mixed alloy, some or none of the elements of the first GBM alloy may be diffused into the particles of the second core alloy.

“Green body” carries its normal connotation in the contact of pre-sintered objects.

Within the context of a sintered body, the terms “grain” or “grain body” carries their normal connotation in this context.

Where ranges are provided, it is intended that every integer or tenth of an integer, within the range represents an independent endpoint (either minimum or maximum value) in the same range. For example, a range expressed as “from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, 65 to 70 atom %, 70 to 75 atom %, or any combination of two or more of these ranges" it is intended that other embodiments include those where the range is also expressed as from 5 to 6, 6 to 7, 7 to 8, 8 to 9, 9 to 10 atom . . . 70 to 71, 71 to 72, 73 to 74, 75 atom %, or any combination of two or more of these ranges"

The term "is greater than at least one of" a series of values (such as "provided the combined amounts of Nd+Pr+Dy+Tb are greater than at least one of 95, 98, 99, 99.5, 99.8, or 99.9 atom %") is intended to connote that each of the series of values are independent embodiments. Further, in cases where a sum of values is described as greater than one or more values (e.g, "greater than at least one of 95, 98, 99, 99.5, 99.8, or 99.9 atom %") it should be apparent that the sum of does not exceed 100 atom %. Further, a description of "greater than at least one of 95, 98, 99, 99.5, 99.8, or 99.9 atom %" also includes separate embodiments where the sum is in a range of from 95 to 98, 98 to 99, 99 to 99.5, 99.5 to 99.8, 99.8 to 99.9, 99.9 to 100 atom %, or any combination of two or more of these ranges. Any nominal difference from 100% may be attributable to accidental impurities or other deliberately added dopants, including from main group elements, such as A1, C, Si, N, O, or P.

Unless otherwise specified, proportions are given in atom % (or mole %). Within a given formula, atom % may also be presented by its decimal equivalent. For example, in the composition $(Nd_{0.01-0.18}\ Pr_{0.01-0.18}\ Dy_{0.3-0.5}\ Tb_{0.3-0.5})_{aa}$ $(Co_{0.85-0.95}\ Cu_{0.04-0.15}\ Fe_{0.01-0.08})_{bb}\ (Zr_{0.00-1.00})_{cc}$, the terms $Nd_{0.01-0.18}$ and $Pr_{0.01-0.18}$ refer to these elements present in a range of from 1 to 18 atom % and the terms $Dy_{0.3-00.5}$ and $Tb_{0.3-0.5}$ refer to these elements present in a range of from 30 to 50 atom %.

"Optional" or "optionally" means that the subsequently described circumstance may or may not occur, so that the description includes embodiments where the circumstance occurs and instances where it does not.

This disclosure refers to chemical compositions, both bulk with respect to homogeneous or substantially homogeneous alloys and powders and with respect to compositions within a particle or grain or within or across a grain boundary. In such circumstances, the embodiments describing these compositions implicitly describe the methods used to measure the quality or properties of these compositions. For example, where the overall chemical composition of the alloys or particles are described, the embodiment described can be read as that composition having been identified by an appropriate method including, for example, Inductively Coupled Plasma ("ICP"). Similarly, where an embodiment describes a composition within a particle or grain or grain boundary, the embodiment can be read as that composition having been identified or characterized using Energy dispersive X-ray Spectroscopy ("EDS") mapping across a fractured or polished surface comprising that particle, grain, or grain boundary. In such cases, the samples may be prepared for analysis by (gently) polishing the surface(s) using a 1200 grinding paper comprising SiC before inserting them into the SEM for EDS analysis. Alternatively, the surface(s) may be polished using a diamond paste and rinsed. Once in the SEM, and prior to the EDS analysis, the surface is or may be cleaned with Ga Ions to ensure a clean and oxygen-free surface.

Various embodiments of the present disclosure include methods of preparing sintered magnetic bodies having improved coercivity and remanence, each method comprising:

(a) homogenizing a first population of particles of a first GBM alloy with a second population of particles of a second core alloy, the weight ratio of the first and second population of particles is in a range of from about 0.1:99.9 to about 16.5:83.5 to form a composite alloy preform (i.e., 1-16.5 parts first GBM alloy: 99.9-83.5 parts second alloy); wherein
  (i) the first GBM alloy is substantially represented by the formula: $AC_bR_xCo_yCu_dM_z$, where
    (A) AC comprises Nd and Pr in an atomic ratio in a range of from 0:100 to 100:0, and b is a value in a range of from about 5 atom % to about 65 atom %;
    (B) R is one or more rare earth element and x is a value in a range of from about 5 atom % to about 75 atom %;
    (C) Co is cobalt and Cu is copper;
    (D) y is a value in a range of from about 20 atom % to about 60 atom %;
    (F) d is a value in a range of from about 0.01 atom % to about 12 atom %;
    (G) M is at least one transition metal element, exclusive of Cu and Co, and z is a value in a range of from about 0.01 atom % to about 18 atom %; and
    (H) the sum of b+x+y+d+z is greater than 95 atom %, or greater than 95, 98, 99, 99.5, 99.8, or 99.9 atom % up to about 99.9 or 100 atom %. Typically, the first GBM alloy contains less than 0.1 wt % oxygen or carbon.
  (ii) the second core alloy is substantially represented by $G_2Fe_{14}B$, where G is a rare earth element, the second core alloy optionally doped one or more transition metal or main group element (defined further herein);
(b) heating the composite alloy preform to a temperature greater than the solidus temperature of the first alloy but less than the melting temperature of the second core alloy to form a population of discrete mixed alloy particles.

Other embodiments provide methods of preparing a sintered magnetic body having improved coercivity and remanence, each method comprising:

(a) homogenizing a first population of particles of a first Grain Boundary Modifying (GBM) alloy with a second population of particles of a second core alloy, the weight ratio of the first and second population of particles is in a range of from about 0.1:99.9 to about 16.5:83.5 to form a composite alloy preform; wherein
  the second core alloy is substantially represented by the formula $G_2Fe_{14}B$, where G is a rare earth element, for example Nd; optionally, the second core alloy is doped with one or more transition metal or main group element (so as to allow the use of materials resulting from the use of virgin or recycled materials);
  the mean particle diameter of the first population of particles of the first GBM alloy is in a range of from 1 micron to about 4 microns;
  the mean particle diameter of the second population of particles of the second core alloy is in a range of from about 2 microns to about 5 microns; and
(b) heating the composite alloy preform to a temperature greater than the solidus temperature of the first alloy but less than the melting temperature of the second core alloy to form a population of discrete mixed alloy particles.

In some of these embodiments, the mixed alloy particles may be characterized as the second core alloy particles comprising a first GBM alloy coating, either present as a particulate coating (i.e., in the composite alloy preform) or as a continuous or semi-continuous (in the discrete mixed alloy particles) coating. In some embodiments, the coating of the first GBM alloy has a coating thickness in a range of from 0.05 to 0.1, from 0.1 to 0.15, from 0.15 to 0.2, from 0.2 to 0.25, from 0.25 to 0.3, from 0.3 to 0.35, from 0.35 to 0.4, from 0.4 to 0.45, from 0.45 to 0.5 microns, or a range combining two or more of these ranges; for example, from 0.1 to 0.25 microns.

While this disclosure is given in terms of a first GBM and second core alloy, nothing precludes the further addition of additional populations of individual main group or transition or rare earth element particles. This disclosure contemplates these as further embodiments.

In other embodiments, the homogenizing step (a) is preceded by treating coarse particles of either the first GBM or second core alloy or both the first GBM and second core alloys with hydrogen under conditions and for a time sufficient to allow absorption of the hydrogen into either the first GBM or second core alloy or both the first GBM and second core alloys. Such embodiments allow for the use of alloy forms that are conveniently prepared albeit in large particle or flake form.

In still other embodiments, the methods further and independently comprise: (c) compressing the population of mixed alloy particles together to form a green body, under a magnetic field of a suitable strength to align the magnetic particles with a common direction of magnetization in an inert atmosphere; (d) heating the green body to at least one temperature in a range of from about 800° C. to about 1500° C. for a time sufficient to sinter the green body into a sintered body comprising sintered core shell particles and a grain boundary composition; and (e) heat treating (or annealing) the sintered body in an environment of cycling vacuum and inert gas, optionally in the presence of a magnetic field.

Significantly improving on methods currently known in the art for providing such mixed metal systems, the methods of the present disclosure are particularly suitable for mixing multiple metals with particles of the second core alloy to provide more uniform and homogeneously distributed particles of discrete mixed alloy particles. For examples, the first GBM alloy may comprise at least 3, 4, 5, 6 or more rare earth or transition metals, providing for the stoichiometrically precise addition of these metals to the second core alloy. This provides a much more convenient and reproducible means of adding such materials, relative to the addition of separate powders for each individual element.

The present methods rely on the initial intimate metallurgical mixing of the particles to provide the mixed alloy (pre-sintered) particles. This intimate mixing provides for the ability to produce substantially homogeneously constructed sintered bodies of superior performance using less expensive additives.

So as to help visualize the various terms, and in the context that certain embodiments provide for sintered bodies comprising core shell grains embedded or held together by grain boundary compositions, the first GBM alloy made be considered to be a pre-grain boundary material (e.g., the GBM alloy ultimately forms a grain boundary material) and the second core alloy considered to be the core-shell particle precursor (e.g., at least a portion of the second core alloy ultimately forms the core of the core-shell particle). Further, $Nd_2Fe_{14}B$ may be seen as one convenient embodiment of this second core alloy, though in neither case is the disclosure limited to these exemplars or descriptions, nor do these characterizations limit the compositions to those applications. Through the processing steps described and claimed herein, the two alloys interact to form the target sintered structures.

Preparing the Inventive Powders

In some embodiments, the GBM alloys may be prepared by methods including induction casting, strip casting, or atomized powder methods (see Examples). Similarly, the second core alloy is a hard magnetic alloy produced, in some implementations by traditional strip casting or by recycling existing rare earth metal magnets. The elements are combined in these alloys as non-oxides, and the reactions done in the substantial absence of oxygen (i.e., taking deliberate steps to avoid the introduction of air or oxygen during processing, for example by processing the alloys under inert atmospheres. For the sake of completeness, it should also be apparent that the first GBM alloy should be comprised of a combination of AC, R, Co, Cu, and M in the recited proportions so as to be capable of forming an alloy or intermetallic compound both with itself and with the second core alloy. Also, the first GBM alloy is typically more friable than the second core alloy, which is typically much harder, allowing for requisite processing. Also, the first GBM alloy has a lower melting point than the second core alloy, or at least is more susceptible to its elements migrate into the second core alloy than vice versa.

Figure 2:
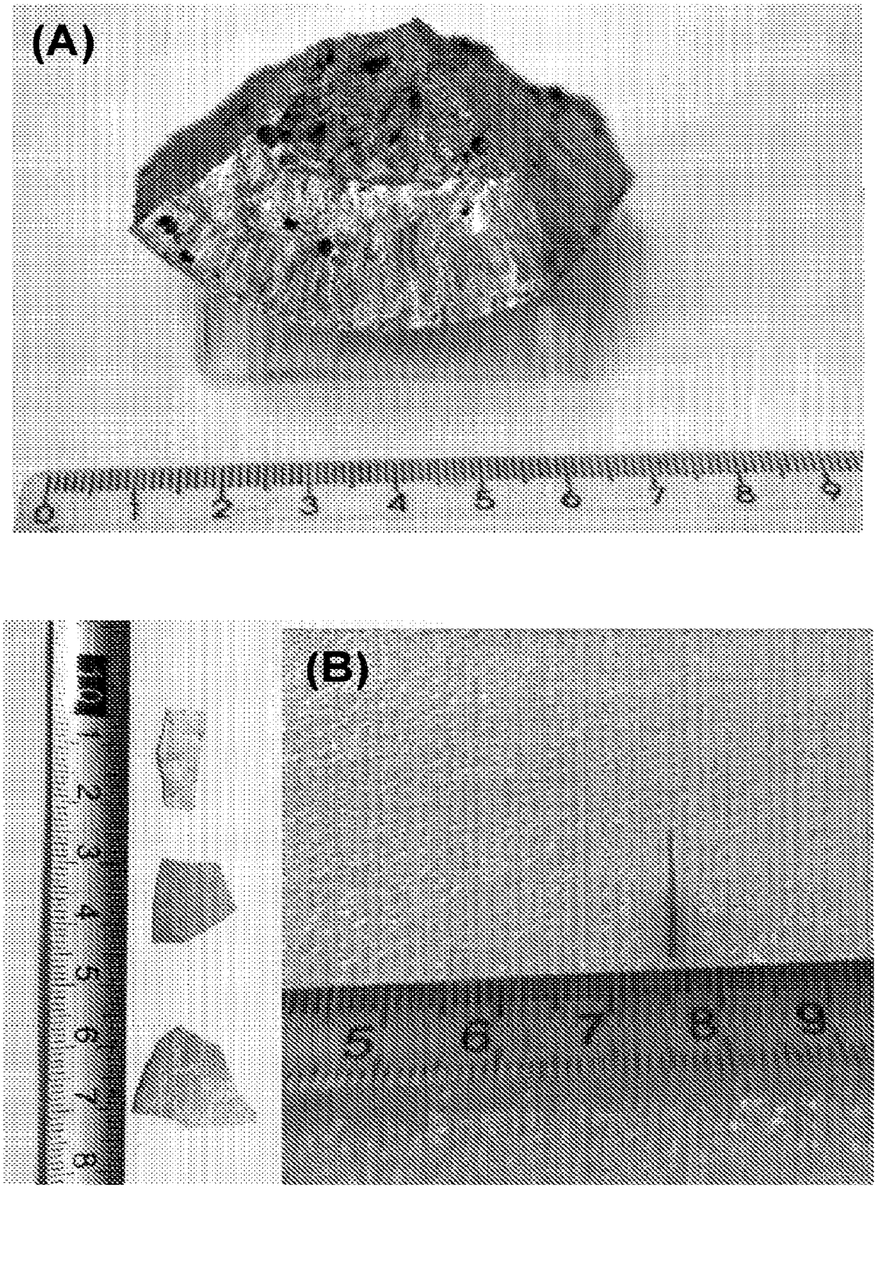
FIG. 2 shows some physical forms of GBM alloy materials: (A) shows a form of the GBM alloy and (B) shows examples of strip cast flakes.

The methods are described in terms of pre-treating coarse particles of either the first GBM or second core alloy or both the first GBM and second core alloys in the presence of hydrogen under conditions and for a time to allow absorption of the hydrogen into either the first GBM alloy or second core alloy or both the first GBM alloy and second core alloys, prior to the homogenizing step (a). Such hydrogen treatments may comprise treating the respective alloy(s) to hydrogen pressures from 0.1 bar to 150 bar, preferably from 1 bar to 10 bar. While the term "coarse" in terms of particle size may be defined in terms of any size larger than ten microns (in any aspect direction), the term may also reflect the use of starting materials derived from induction casting, strip casting, or atomized powder methods of preparing the bulk alloys. In such cases, the material forms typically provided to the processes are flakes or pieces having dimensions on the centimeter scale. In some examples, the first (GBM) flake can have initial dimensions on the order of 5 cm×5 cm×7 cm (e.g., see FIG. 2(A)), and the second (e.g., an NdFeB) flake can have initial dimensions on the order of 0.2 cm×2-6 cm×2-8 cm (e.g., see FIG. 2(B)). Typically, the thickness distribution of the strip cast flakes is Gaussian with a +/−2.5% standard deviation tolerated around the mean value. Also typically, the GBM flake initial dimension has a Gaussian distribution as well with a 5% accepted variability across the identified dimensions.

The hydrogen treatments may be followed by an outgassing treatment, for example at temperatures in a range of from about 200° C. to about 850° C. or from about 400° C. to about 600° C., but less than the melting temperature of the first GBM alloy. This cycling of hydrogen absorption and desorption is a convenient and effective means for destabilizing the initial flakes or chunks, making them more susceptible to pulverization during the homogenization stage. For example, NdFeB magnets are composed of two main phases; a magnetic grain, crystal or core phase composed of $Nd_2Fe_{14}B$, surrounded by a thinner Neodymium (Nd) rich phase that 'coats' each core grain and is known as the 'grain boundary.' During the present processing, the surface area of the core grain phase is increased via a series of selective decrepitation and milling steps that break the large core phases, present in the newly strip cast NdFeB alloy, into smaller crystals and/or particles without destroying their intrinsic magnetic potential. This typically results in recovery of ~95% of the mass of $Nd_2Fe_{14}B$ but this material is now present as a much larger number of tiny cores or grains.

In addition to, and/or complementing the hydrogen decrepitation step(s), the homogenizing step (a) may comprise multiple separate mixing steps, which increases the average surface area of at least one, preferably both, of the particle populations. In preferred embodiments, three such mixing steps are used: the first to initiate composition shift within the mixture; the second to uniformly distribute the first GBM alloy with the second core alloy by increasing the surface area; and the third to achieve a final, targeted composition of the mixture.

Exemplary processing includes the simultaneous mixing and heating to retain particulate form. The temperatures used during mixing can be and preferably are cycled between at least first and second temperatures, the first temperature being about ambient (in a range of about 23° C. to 30° C.) and second temperature being in a range of from about 75° C. to about 125° C., preferably 80° C. Conveniently, the two powders are mixed in a rotating mixer, for example being rotated for at least 50 or 60 minutes at 30 to 60 revolutions per minute to produce a substantially homogeneous composition.

Figure 3:
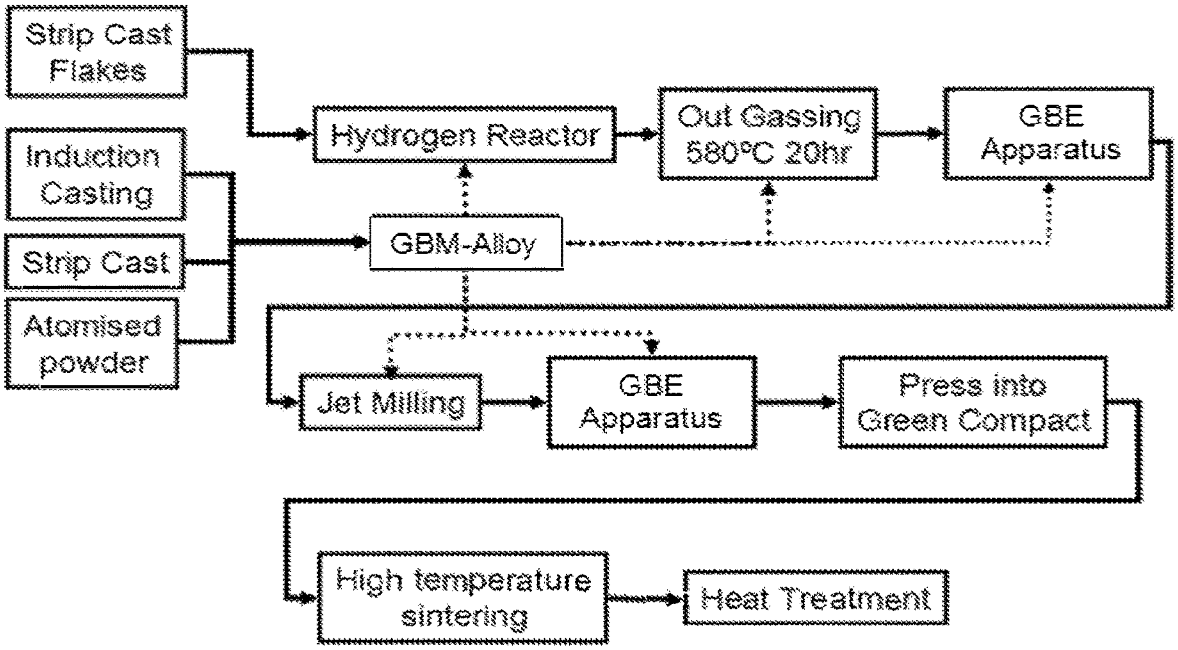
FIG. 3 shows one exemplary process flow diagram, highlighting various options for manufacturing Grain Boundary Modifying (GBM alloys) and the various processing stages where the GBM alloy can be added to strip cast flakes to make an exemplary GBE-NdFeB magnet.

See also FIG. 3 for a schematic representation of exemplary steps available for use in such processes and the Examples for representative methods.

In some embodiments, the homogenizing/mixing steps are effected with the first and second particles as dry particles by tumbling in one or more rotating mixing chambers. In some embodiments, the homogenizing/mixing steps are done by attrition milling, using attritor balls. In both cases, the walls of the chambers and/or the attritor balls should be of sufficient hardness, relative to the first and second alloy particles, so that there is virtually no material transfer from the former to the latter.

The methods are flexible both in terms of the options available for the chemical composition of the first GBM alloys, and also for the ratio of the first GBM and second core alloys. In the methods, the first population of particles of a first GBM alloy and the second population of particles of a second core alloy may be mixed in any weight ratio combination from 0.1:99.9 to 99.9:0.1, consistent with the final desired composition. In the context of the previous description, the relative amounts of the first and second alloys may be defined as ranging from 0.1 parts of the first alloy per 99.9 parts of the second alloy to 16.5 parts of the first alloy per 83.5 parts of the second alloy. Additional independent embodiments include those incremental ratios of the first GBM alloy, including 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 1.5, 12, 12.5, 13, 13.5, 14, 14.5. 15, 15.5, 16, or 16.5 parts of the first alloy (per 100 parts of the final composition) are mixed with a complementary amount of the second core alloy. Any ratio of two of these values may comprise an independent embodiment, for example, from 6.5 parts first alloy to 93.5 parts of the second core alloy.

In principle, the purpose of the homogenizing steps are to provide substantially homogeneous mixed alloy powders, such that the GBM alloy particles can subsequently 'coat' the particles of the second core alloy (e.g., the $Nd_2Fe_{14}B$ particles). To achieve this, both $Nd_2Fe_{14}B$ and bulk pieces of the proprietary alloy are milled to very fine particles (~3.8 micrometers).

Even in the case where the physical forms of the source materials of the first GBM alloy are physically larger than those of the second core alloy particles, the relative hardness and friability of the two materials typically results in particle sizes in which the particle sizes of the first GBM alloy are smaller than those of the second core alloy. In some embodiments, the mean particle diameter of the first population of particles of the first GBM alloy is in a range of from about 0.5 microns to about 5 microns, or any individual or combination of sub-ranges including from 0.5 to 0.8 microns, from 0, 8 to 1 micron, from 1 to 2 microns, from 2 to 2.5 microns, from 2.5 to 3 microns, from 3 to 4 microns, or from 4 to 5 microns, or a range combining two or more of these ranges, for example 1 micron to 4 microns.

In some embodiments, the mean particle diameter of the second population of particles of the second core alloy is in a range of from about 2 microns to about 5 microns. In some embodiments, this range may be from 2 to 2.2 microns, from 2.2 to 2.4 microns, from 2.4 to 2.6 microns, from 2.6 to 2.8 microns, from 2.8 to 3 microns, from 3 to 3.2 microns, from 3.2 to 3.4 microns, from 3.4 to 3.6 microns, from 3.6 to 3.8 microns, from 3.8 to 4 microns, from 4 to 4.2 microns, from 4.2 to 4.4 microns, from 4.4 to 4.6 microns, from 4.6 to 4.8 microns, from 4.8 to 5 microns, from 5 to 5.2 microns, from 5.2 to 5.4 microns, from 5.4 to 5.6 microns, from 5.6 to 5.8 microns, from 5.8 to 6 microns, or any combination of two or more of these ranges. The resulting mixed alloy particles, which may be envisioned as second core alloy particles coated with first GBM alloy particles, reflect the additive nature of the mixing, and in some embodiments, the mean particle of the population of discrete mixed alloy particles is targeted to be in a range of from about 2 microns to about 6 microns, preferably 3 to 4 microns.

The actual form of the mixed alloy particles depends on the heat treatment conditions and the specific nature of the first GBM alloy. In some cases, the first GBM alloy may be simply adhered to the second core alloy or may partially or completely coat the second core alloy, or the elements of the first alloy may have begun to migrate into the second core alloy particles. Any given mixture of these particles may contain one or more of these types of particles.

In certain embodiments, the composition of the particles is monitored during this processing using methods including the use of Inductively Coupled Plasma ("ICP"). Typically, samples are taken from the mixing chambers during processing and tested by ICP. In each case, at least three samples are taken and tested, and the mixture is considered substantially homogeneous when the results of the three analyses are within some predetermined target range. Once homogenized, the particles are also tested for proper particle sizing, using a particle size analyzer, as are available for this purpose (see, e.g., Examples). If the compositions differ from the targeted compositions, adjustments may be made by the addition of particles of the first or second alloys, depending on the adjustments to be made to the compositions. If the particles sizes are too large, the mixing is continued.

The Chemical Nature of the Powders

Before moving on to the steps directed to forming, sintering, and annealing of green bodies comprising the mixed alloy particles, it is useful to describe the chemical nature of the alloys. The following descriptions of the first and second alloys, the mixed, alloy particles, the green bodies, and the grains and grain boundaries of the sintered bodies apply both the compositions themselves and to the methods employing these compositions.

In some embodiments, the first GBM alloy comprises a composition stoichiometry of $AC_bR_xCo_yCu_dM_z$, where AC, R, M, b, x, y, d, and z are broadly described elsewhere herein. It should be apparent that this additive alloy is substantively different than second core alloy. In some embodiments, the GBM alloy does not contain any added boron. In some embodiments, the GBM alloy does not contain any added aluminum. In other embodiments, the GBM alloy does not contain any tin. In still other embodiments, the GBM alloy does not contain any zinc. The circumstances in which any or all of these embodiments does not contain any added A1, B, Sn, or Zn may not necessarily preclude the possibility that these elements are present as unavoidable impurities, but the composition or GBE engineering does not rely on their presence for modifying the ultimately formed GBE magnets.

In some other embodiments, the first GBM alloy is substantially represented by the formula $Nd_jDy_kCo_mCu_nFe_p$, where j, k, m, n, and p, and their relationship with respect to one another are broadly described elsewhere herein. In these embodiments, the first GBM alloy comprises a material substantially represented by the formula $Nd_jDy_kCo_mCu_nFe_p$, where j, k, m, n, and p, and their relationship with respect to one another are broadly described elsewhere herein. That is, in these latter embodiments, the first GBM alloy contains one or more of the additional rare earth or transition metals as described herein, at levels also described herein.

Figure 6:
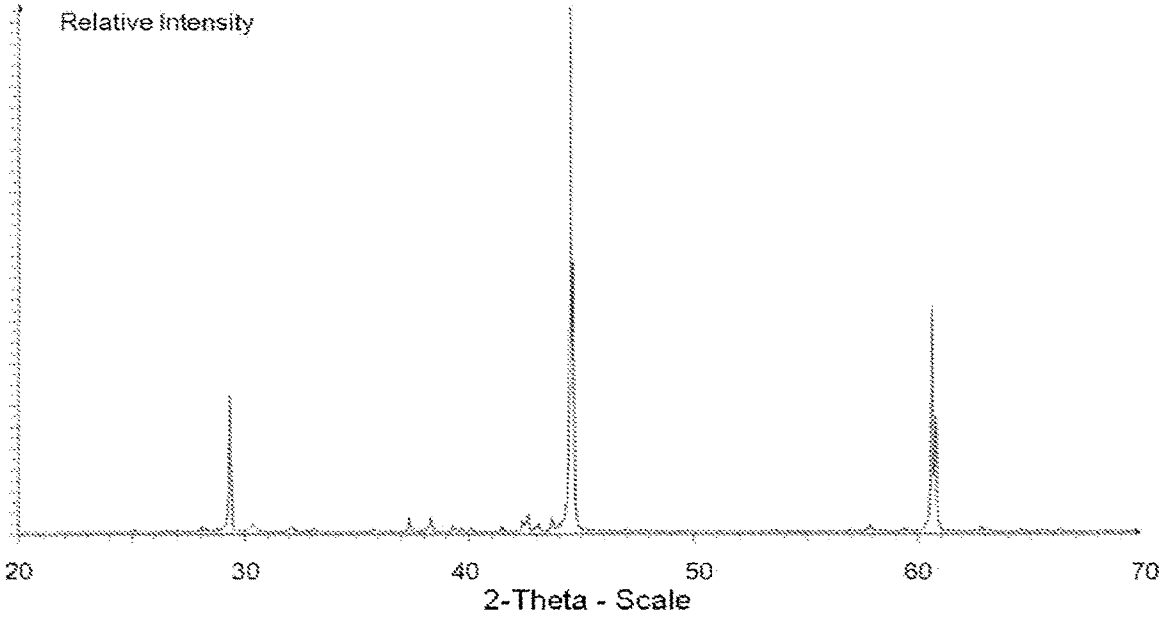
FIG. 6 shows an exemplary powder XRD pattern for a representative first GBM alloy (see, e.g., Table 3).
Figure 7:
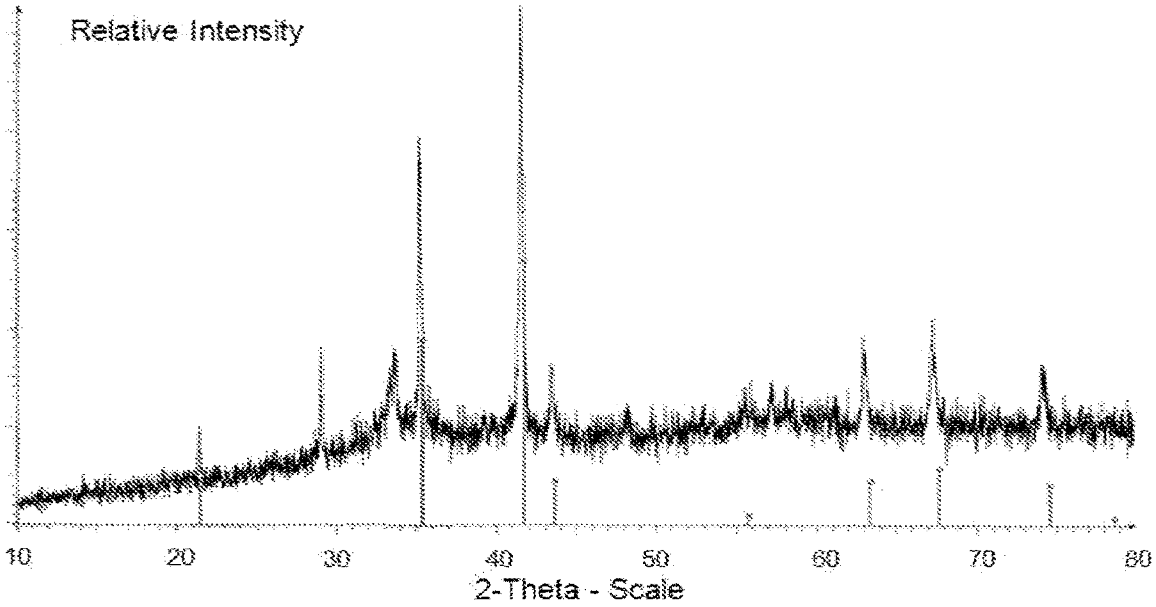
FIG. 7 shows an exemplary powder XRD pattern for a representative second GBM alloy (see, e.g., Table 4).

The first GBM alloy may be amorphous (showing no features in an XRD pattern), semi-crystalline (showing only broadened features in an XRD pattern), or crystalline (showing well defined XRD features—see, e.g., FIG. 6). When crystalline, in some embodiments, the form contains columnar and globulite crystals.

As described above, in some embodiments where the first GBM alloy comprises a composition stoichiometry of $AC_bR_xCo_yCu_dM_z$, AC comprises Nd and Pr in an atomic ratio in a range of from 0:100 to 100:0 (with certain aspects of this range also including 0:100, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 100:0), and b is a value in a range of from about 5 atom % to about 65 atom %. In additional embodiments, the atomic ratio of Nd to Pr in AC is 100:0 (i.e., only Nd), 25:75, 50:50, 75:25, or 0:100 (i.e., only Pr). Commercial sources of Nd and Pr are available for materials having these ratios, making them convenient sources for the manufacture of the GBM alloys.

In still further independent embodiments, where the first GBM alloy comprises a composition stoichiometry of $AC_bR_xCo_yCu_dM_z$, b is a value in a range of from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, or any combination of two or more of these ranges. One non-limiting exemplary combination range includes the range of from 10 to 50 atom %. Other embodiments include those where the range is defined by integer values within these ranges, for example from about 9 to about 16 atom %.

As is also described above, where the first GBM alloy comprises a composition stoichiometry of $AC_bR_xCo_yCu_dM_z$, in some embodiments, R is one or more rare earth element. The rare earth elements include members of the Lanthanide and Actinide series, though the members of the Lanthanide series are preferred. Members of this series include La, Ce, Pr, Nd, Pm, Sm, Eu, Gd, Tb, Dy, Ho, Er, Tm, Yb, and Lu. Various independent embodiments also include any one or more of these elements, though preferably containing at least 3, 4, 5, 6, 7, 8, 9, 10, 11, 12, 13, or 14 of these elements, more preferably at least 6, 7, 8, 9, 10, 11, 12, 13, or 14 of these elements. In additional embodiments, R is Nd, Pr, La, Ce, Gd, Ho, Er, Yb, Dy, Tb, or a combination of 2, 3, 4, 5, 6, 7, or 8 of these separate elements, preferably at least 3, 4, 5, 6, 7, or 8 of these separate elements. It should be appreciated that in individual embodiments, any element or elements within the class of rare earth elements may be individually included in a sub-genus or individually excluded from the genus or sub-genus. Sm is specifically excluded in some of these combinations.

Where the first GBM alloy is represented by $AC_bR_xCo_yCu_dM_z$, in some embodiments, x is a value in a range of from about 5 atom % to about 75 atom %. In other independent embodiments, x is a value in a range of from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, 65 to 70 atom %, 70 to 75 atom %, or any combination of two or more of these ranges. Exemplary, non-limiting, combination ranges include 30 to 60 atom % or 10 to 60 atom %. Other embodiments include those where the range is defined by integers within these ranges, for example from about 38 to about 48 atom %. Again, as described elsewhere, the disclosure described combinations of elements are separable and individual elements as combinable. As but one example of this, referring to R and x, in some embodiments, R comprises at least three or more different rare earth elements, the total (i.e., x) representing a value in a range described above, for example the range being from about 10 atom % to about 60 atom % of the first GBM alloy.

In the formula, $AC_bR_xCo_yCu_dM_z$, Co is present in the first GBM alloy in an amount ranging from about 20 atom % to about 60 atom %. In separate independent embodiments, y is a value in a range of from 20 to 25 atom %, 25 to 30 atom %, 30 to 35 atom %, 35 to 40 atom %, 40 to 45 atom %, 45 to 50 atom %, 50 to 55 atom %, 55 to 60 atom %, or any combination of two or more of these ranges; exemplary, non-limiting combination ranges include 30 to 40 atom %. Other embodiments include those where the range is defined by integers within these ranges, for example from about 32 atom % to about 46 atom %.

In the formula, $AC_bR_xCo_yCu_dM_z$, Cu is present in the first GBM alloy in a range of from about 0.01 atom % to 15 atom %. In independent embodiments, d is a range of from 0.01 to 0.05 atom %, 0.05 to 0.1 atom %, 0.1 to 0.15 atom %, 0.15 to 0.2 atom %, 0.2 to 0.25 atom %, 0.25 to 0.5 atom %, 0.5 to 1 atom %, 1 to 1.5 atom %, 1.5 to 2 atom %, 2 to 2.5 atom %, 2.5 to 3 atom %, 3 to 3.5 atom %, 3.5 to 4 atom %, 4 to 4.5 atom %, 4.5 to 5 atom %, 5 to 5.5 atom %, 5.5 to 6 atom %, 6 to 7 atom %, 7 to 8 atom %, 8 to 9 atom %, 9 to 10 atom %, 10 to 11 atom %, 11 to 12 atom %, 12 to 13 atom %, 13 to 14 atom %, 14 to 15 atom %, or any combination of two or more of these ranges. For example, in one exemplary combination range, Cu is present in a range of from 0.01 to 6 atom %. Other embodiments include those where the range is defined by one tenth integer values within these ranges, for example from about 3.1 to about 8.9 atom %.

In the formula, $AC_bR_xCo_yCu_dM_z$, M is at least one transition metal element, exclusive of Cu and Co, and is present in the first GBM alloy in an amount ranging from about 0.01 atom % to about 18 atom %. The presence of low levels of Zr in the presence of Fe appears to provide specific benefits described herein.

The genus described as transition metals, M, includes the elements of Groups 3 to 12 and Rows 4 to 6 of the periodic table, exclusive of Cu and Co, which are accounted for separately in the formula. The transition metals include, for example, Sc, Y, Ti, Zr, Hf, V, Nb, Ta, Cr, Mo, W, Mn, Tc, Re, Fe, Ru, Os, Rh, Ir, Ni, Pd, Pt, Ag, Au, Zn, Cd, and Hg. Various independent embodiments also include any one or more of these elements, though preferably containing at least 3, 4, 5, 6, 7, 8, 9, or 10 of these elements, more preferably at least 6, 7, 8, 9, or 10 of these elements. In additional embodiments, M is Ag, Au, Fe, Ga, Mo, Nb, Ni, Ti, V, W, Y, Zr, or a combination of two or more of these elements. In still further embodiments, M comprises Fe and Zr. In separate embodiments, M comprises 1, 2, 3, 4, 5, 6, 7, 8, 9, 10, 11, 12, or 13 separate transition metal elements, exclusive of Cu and Co, preferably at least 3, 4, 5, 6, 7, 8, 9, 10, 11, or 12 separate transition metal elements, exclusive of Cu and Co. As described above with respect to R, it should be appreciated that in individual embodiments, any element or elements within the class of transition metal elements may be individually included in a sub-genus or individually excluded from the genus or sub-genus.

For present purposes, this genus of transition metals does not include any of the Lanthanide or Actinide series of elements or Cu or Co, which are separately considered in the formula for the first GBM alloy.

Where the first GBM alloy is represented by $AC_bR_xCo_yCu_dM_z$, in independent embodiments M is present in the first GBM alloy in a range of from about 0.01 atom % to 10 atom %. In independent embodiments, z is a range of from 0.01 to 0.05 atom %, 0.05 to 0.1 atom %, 0.1 to 0.15 atom %, 0.15 to 0.2 atom %, 0.2 to 0.25 atom %, 0.25 to 0.5 atom %, 0.5 to 1 atom %, 1 to 1.5 atom %, 1.5 to 2 atom %, 2 to 2.5 atom %, 2.5 to 3 atom %, 3 to 3.5 atom %, 3.5 to 4 atom %, 4 to 4.5 atom %, 4.5 to 5 atom %, 5 to 5.5 atom %, 5.5 to 6 atom %, 6 to 7 atom %, 7 to 8 atom %, 8 to 9 atom %, 9 to 10 atom %, 10 to 11 atom %, 11 to 12 atom %, 12 to 13 atom %, 13 to 14 atom %, 14 to 15 atom %, 15 to 16 atom %, 16 to 17 atom %, 17 to 18 atom %, or any combination of two or more of these ranges; exemplary combination ranges include from 0.01 to 10 atom %, from 0.01 to 8 atom %, from 0.5 to 5 atom % or from 1 to 2 atom %. Again, with respect to the first GBM alloy, the amounts of both Co and Cu are considered within the values cited for y and d, respectively. In some embodiments, M (and so the GBM alloy) does not contain any added aluminum. In other embodiments, M (and so the GBM alloy) does not contain any tin. In still other embodiments, M (and so the GBM alloy) does not contain any zinc. The circumstances in which any or all of these embodiments does not contain any added A1, B, Sn, or Zn may not necessarily preclude the possibility that these elements are present as unavoidable impurities, but the composition or GBE engineering does not rely on their presence for modifying the ultimately formed GBE magnets. In some embodiments, the amount of Fe contained in M (and so the GBM alloy) is in a range of 0 to 0.5 atom %, from 0.5 to 1 atom %, from 1.5 to 2 atom %, from 2 to 2.5 atom %, from 2.5 to 3 atom %, for 3 to 3.5 atom %, from 3.5 to 4 atom %, from 4 to 4.5 atom %, from 4.5 to 5 atom %, from 5.5 to 6 atom %, from 6 to 6.5 atom %, from 6.5 to 7 atom %, from 7 to 7.5 atom %, from 7.5 to 8 atom %, or any combination of two or more of these ranges, for example from 0.5 to 4 atom %

In the formula provided for the first GBM alloy, in some embodiments, the sum of b+x+y+d+z is greater than 95 atom %. In some preferred embodiments, this sum is greater than one or more of 98, 99, 99.5, 99.8, or 99.9 atom %, most preferably up to 99.9 atom % or practically 100 atom %. Any variance from 100 atom % reflects accidental impurities or deliberate additions of other elements, for example, main group elements of the periodic table, for example introduced during process or from the raw materials used in preparing the alloys. Such impurities may include A1, C, Si, N, O, P, for example. Typically, the first GBM alloy contains less than 0.1 weight % oxygen or carbon.

Within the more general definitions of the formula for the first GBM alloy, certain elemental compositions may be preferred. For example, in some embodiments, the first GBM alloy comprises at least neodymium, praseodymium, dysprosium, cobalt, copper, and iron. In other embodiments, Zr is also present. In other embodiments, nickel and/or cobalt are present in the first GBM alloy and, when present, can together account for at least 36 atom % of the total composition of the first GBM alloy. In other embodiments, iron and/or titanium are present in the first GBM alloy and, when present, can together account for at least 2 atom % of the total composition of the first GBM alloy.

In some embodiments, the first GBM alloy is substantially represented by the formula of $(Nd_{0.01-0.18}\ Pr_{0.01-0.18}\ Dy_{0.3-0.5}\ Tb_{0.3-0.5})_{aa}\ (Co_{0.85-0.95}\ Cu_{0.04-0.15}\ Fe_{0.01-0.08})_{bb}\ (Zr_{0.00-1.00})_{cc}$; wherein:

- aa is a value in a range of from 42 atom % to 75 atom %;
- bb is a value in a range of from 6 atom % to 60 atom %; and
- cc is a value in a range of from 0.01 atom % to 18 atom %;
- provided the combined amount of Nd+Pr is greater than 12 atom %;
- provided the combined amount of Nd+Pr+Dy+Tb is greater than at least one of 95, 98, 99, 99.5, 99.8, or 99.9 atom % to about 99.9 or 100 atom %;
- provided the combined amounts of Co+Cu+Fe is greater than 95, 98, 99, 99.5, 99.8, or 99.9 atom % to about 99.9 or 100 atom %; and
- provided aa+bb+cc is greater than 0.995 to about 0.999 or 1.

In some embodiments, these compositions are subsets, and incorporate the specific features, of the more general formula $AC_bRxCo_yCu_dM_z$, as otherwise defined herein.

Within this formula, Nd and Pr are described in the context (i.e., of $((Nd_{0.01-0.18}\ Pr_{0.01-0.18}\ Dy_{0.3-0.5}\ Tb_{0.3-0.5})_{aa})$ as independently present in a range from 1 to 18 atom %. In separate embodiments, these independent ranges may further be defined as from 1 to 2 atom %, from 2 to 3 atom %, from 3 to 4 atom %, from 4 to 5 atom %, from 5 to 6 atom %, from 6 to 7 atom %, from 7 to 8 atom %, from 8 to 9 atom %, from 9 to 10 atom %, from 10 to 11 atom %, from 11 to 12 atom %, from 12 to 13 atom %, from 13 to 14 atom %, from 14 to 15 atom %, from 15 to 16 atom %, from 16 to 17 atom %, from 17 to 18 atom %, or any combination of two or more of these ranges, for example, from 4 to 18 atom %.

Within this formula, Dy and Tb are described in the context (i.e., of $((Nd_{0.01-0.18}\ Pr_{0.01-0.18}\ Dy_{0.3-0.5}\ Tb_{0.3-0.5})_{aa})$ as independently present in a range from 30 to 50 atom %. In separate embodiments, these independent ranges may further be defined as from 30 to 32 atom %, from 32 to 34 atom %, from 34 to 36 atom %, from 36 to 38 atom %, from 38 to 40 atom %, from 40 to 42 atom %, from 42 to 44 atom %, from 44 to 46 atom %, from 46 to 48 atom %, from 48 to 50 atom %, or any combination of two or more of these ranges, for example, from 36 to 42 atom %.

Within this formula, Co is described in the context (i.e., of $((Co_{0.85-0.95}\ Cu_{0.04-0.15}\ Fe_{0.01-0.08})_{bb})$ as independently present in a range from 85 to 95 atom %. In separate embodiments, these independent ranges may further be defined as from 85 to 85.5 atom %, from 85.5 to 86 atom %, from 86 to 86.5 atom %, from 86.5 to 87 atom %, from 87 to 87.5 atom %, from 87.5 to 88 atom %, from 88 to 88.5 atom %, from 88.5 to 89 atom %, from 89 to 89.5 atom %, from 89.5 to 90 atom %, from 90 to 90.5 atom %, from 90.5 to 91 atom %, from 91 to 91.5 atom %, from 91.5 to 92 atom %, from 92 to 92.5 atom %, from 92.5 to 93 atom %, from 93 to 94 atom %, from 94 to 95 atom %, or any combination of two or more of these ranges, for example, from 85 to 93 atom %.

Within this formula, Cu is described in the context (i.e., of $((Co_{0.85\text{-}0.95}\ Cu_{0.04\text{-}0.15}\ Fe_{0.01\text{-}0.08})_{bb})$ as independently present in a range from 4 to 15 atom %. In separate embodiments, these independent ranges may further be defined as from 4 to 4.5 atom %, from 4.5 to 5 atom %, from 5 to 5.5 atom %, from 5.5 to 6 atom %, from 6 to 6.5 atom %, from 6.5 to 7 atom %, from 7 to 7.5 atom %, from 7.5 to 8 atom %, from 8 to 8.5 atom %, from 8.5 to 9 atom %, from 9 to 9.5 atom %, from 9.5 to 10 atom %, from 10 to 10.5 atom %, from 10.5 to 11 atom %, from 11 to 11.5 atom %, from 11.5 to 12 atom %, from 12 to 12.5 atom %, from 12.5 to 13 atom %, from 13 to 13.5 atom %, from 13.5 to 14 atom %, from 14 to 12.5 atom %, from 14.5 to 15 atom %, or any combination of two or more of these ranges, for example, from 85 to 93 atom %.

Within this formula, Fe is described in the context (i.e., of $((Co_{0.85\text{-}0.95}\ Cu_{0.04\text{-}0.15}\ Fe_{0.01\text{-}0.08})_{bb})$ as independently present in a range from 1 to 8 atom %. In separate embodiments, these independent ranges may further be defined as from 1 to 1.5 atom %, from 1.5 to 2 atom %, from 2 to 2.5 atom %, from 2.5 to 3 atom %, from 3 to 3.5 atom %, from 3.5 to 4 atom %, from 4 to 4.5 atom %, from 4.5 to 5 atom %, from 5 to 5.5 atom %, from 5.5 to 6 atom %, from 6 to 6.5 atom %, from 6.5 to 7 atom %, from 7 to 7.5 atom %, from 7.5 to 8 atom %, or any combination of two or more of these ranges, for example, from 85 to 93 atom %.

Within this formula, Zr is described in the context (i.e., of $((Zr_{0.00\text{-}1.00})_{cc})$ as independently present in a range from 0 to 100 atom %. In separate embodiments, these independent ranges may further be defined as from 0 to 5 atom %, from 5 to 10 atom %, from 10 to 15 atom %, from 15 to 20 atom %, from 20 to 25 atom %, from 25 to 3 atom %, from 30 to 35 atom %, from 35 to 40 atom %, from 40 to 45 atom %, from 45 to 50 atom %, from 90 to 55 atom %, from 55 to 60 atom %, from 60 to 65 atom %, from 65 to 70 atom %, from 70 to 75 atom %, from 75 to 80 atom %, from 80 to 85 atom %, from 85 to 90 atom %, from 90 to 95 atom %, from 95 to 100 atom %, or any combination of two or more of these ranges, for example, from 85 to 93 atom %.

Such compositions may be described more specifically by a stoichiometric formula of $(Nd_{0.01\text{-}0.18}\ Pr_{0.01\text{-}0.18}\ Dy_{0.3\text{-}0.5}\ Tb_{0.3\text{-}0.5})_{aa}\ (Co_{0.85\text{-}0.95}\ Cu_{0.04\text{-}0.15}\ Fe_{0.01\text{-}0.08})_{bb}\ (Zr_{0.00\text{-}1.00})_{cc}$. Individual variances of any of the parenthetical values may independently be ±0.01, ±0.02, ±0.04, ±0.06±0.0.8, or ±0.1.

In independent embodiments, aa is a value in a range of from 42 to 44 atom %, 44 to 46 atom %, 46 to 48 atom %, 48 atom % to 50 atom %, 50 to 52 atom %, 52 to 54 atom %, 54 to 56 atom %, 56 to 58 atom %, 58 to 60 atom %, 60 to 62 atom %, 62 to 64 atom %, 64 to 68 atom %, 68 to 70 atom %, 70 to 72 atom %, 72 to 75 atom %, or any combination of two or more of these ranges, for example, from 52 to 56 atom %.

In other embodiments, bb is a value in a range of from 6 to 8 atom %, from 8 to 10 atom %, from 10 to 12 atom %, from 12 to 14 atom %, from 14 to 16 atom %, from 16 to 18 atom %, from 18 to 20 atom %, from 20 to 22 atom %, from 22 to 24 atom %, from 24 to 26 atom %, from 26 to 28 atom %, from 28 to 30 atom %, from 30 to 32 atom %, from 32 to 34 atom %, from 34 to 16 atom %, from 36 to 38 atom %, from 38 to 40 atom %, from 40 to 42 atom %, from 42 to 44 atom %, from 44 to 46 atom %, from 46 to 48 atom %, from 48 to 50 atom %, from 50 to 52 atom %, from 52 to 54 atom %, from 54 to 56 atom %, from 56 to 58 atom %, from 58 to 60 atom %, or any combination of two or more of these ranges, for examples from 42 to 46 atom %. Other embodiments include those where the range is defined by integer values within these ranges, In still other embodiments, cc is a value in a range of from 0.01 to 0.02 atom %, from 0.02 to 0.03 atom %, from 0.03 to 0.04 atom %, from 0.04 to 0.05 atom %, from 0.05 to 0.06 atom %, from 0.06 to 0.07 atom %, from 0.07 to 0.8 atom %, from 0.08 to 0.09 atom %, from 0.09 to 0.1 atom %, from 0.1 to 0.2 atom %, from 0.2 to 0.3 atom %, from 0.3 to 0.4 atom %, from 0.4 to 0.5 atom %, from 0.5 to 0.6 atom %, from 0.6 to 0.7 atom %, from 0.7 to 0.8 atom %, from 0.8 to 0.9 atom %, from 0.9 to 1 atom %, from 1 to 2 atom %, from 2 to 3 atom %, from 3 to 4 atom %, from 4 to 5 atom %, from 5 to 6 atom %, from 6 to 7 atom %, from 7 to 8 atom %, from 8 to 9 atom %, from 9 to 10 atom %, from 11 to 12 atom %, from 12 to 13 atom %, from 13 to 14 atom %, from 14 to 15 atom %, from 15 to 16 atom %, from 16 to 17 atom %, from 17 to 18 atom %, or any combination of two or more of these ranges, for examples from 0.8 to 1.6 atom %. Other embodiments include those where the range is defined by integer or tenth integer values within these ranges, In one specific embodiment, the alloy is represented by the stoichiometry of Nd 8.7±0.4 atom %; Pr 3.3±0.4 atom %; Dy 21.2±0.4 atom %; Tb 21.2±0.5 atom %; Co 38.2±0.5 atom %; Cu 5.4±0.4 atom %; Fe 1.3±0.3 atom %; Zr 0.6±0.5 atom %, which may be represented as $Nd_{0.9}Pr_{0.3}Dy_{0.21}Tb_{0.22}Co_{0.38}Cu_{0.05}Fe_{0.01}Zr_{0.01}$ (which may alternatively be described as, corresponding to:

$$(Nd_{0.16}\ Pr_{0.06}\ Dy_{0.39}\ Tb_{0.39})_{54.4}\ (Co_{0.85}\ Cu_{0.12}\ Fe_{0.03})_{44.9}\ (Zr_{1.00})_{0.62}.$$

In related embodiments, the variances of each element within this composition are independently ±4.0, 3.0, 2.0, 1.8, 1.6, 1.4, 1.2, 1.0, 0.9, 0.8, 0.7, 0.6, 0.5, 0.4, 0.3, 0.2, or 0.1 atom %.

Next considering the second core alloy as substantially represented by the formula $G_2Fe_{14}B$, again, this material may be derived from virgin or recycled materials, and in either case may be doped may optionally doped with one or more dopants. Again, these descriptions apply to the second core alloy, whether with respect to the composition itself or its use in one or more methods.

Owing to its chemical nature, the second core alloy is magnetic, paramagnetic, ferromagnetic, antiferromagnetic, superparamagnetic, or can be made so under appropriate conditions. Typically, they are made to exhibit such character in the final sintered bodies.

As described above, G is defined as comprising a rare earth element, where G is most broadly defined in terms of the rare earth elements, or combination of rare earth elements defined herein with respect to R. In preferred embodiments, G is defined in terms of Nd, Pr, La, Ce, Gd, Ho, Er, Yb, Dy, Tb, or a combination thereof. In other preferred embodiments, G is substantially Nd with or without Pr. In still other preferred embodiments, G is substantially Nd. As used herein, the term "substantially Nd" refers to a composition in which the bulk of rare earth element content is Nd (e.g., greater than 95, 98, or 99 atom %, but may be doped with other rare earth elements). Note that the nature of the rare earth element(s) in this second core alloy may be the same or different as those in the first GBM alloy, with respect to specific chemical or stoichiometric or proportional basis, or combination thereof. Typically, the rare earth combinations in the first GBM and second core alloys are different.

The second core alloy may be further optionally doped with one or more transition metals or main group elements. In certain embodiments, these dopants comprise one or more of Dy, Gd, Tb, A1, Co, Cu, Fe, Ga, Ti, or Zr. In still more specific embodiments, the second core alloy is further optionally doped with up to 6.5 atom % Dy; up to 3 atom % Gd; up to 6.5 atom % Tb; up to 1.5 atom % A1, up to 4 atom % Co, up to 0.5 atom % Cu, up to 0.5 atom % Fe, up to 0.3 atom % Ga, up to 0.2 atom % Ti, up to 0.1 atom % Zr, or combination thereof. That is, in independent embodiments, the second core alloy may be doped with Dy in a range of from 0 to 0.5 atom %, from 0.5 to 1 atom %, from 1 to 1.5 atom %, from 1.5 to 2 atom %, from 2 to 2.5 atom %, from 2.5 to 3 atom %, from 3 to 3.5 atom %, from 3.5 to 4 atom %, from 4 to 4.5 atom %, from 4.5 to 5 atom %, from 5 to 5.5 atom %, from 5.5 to 6 atom %, from 6 to 6.5 atom %, or any combination of two or more of these ranges. In independent embodiments, the second core alloy may be doped with Tb in a range of from 0 to 0.5 atom %, from 0.5 to 1 atom %, from 1 to 1.5 atom %, from 1.5 to 2 atom %, from 2 to 2.5 atom %, from 2.5 to 3 atom %, from 3 to 3.5 atom %, from 3.5 to 4 atom %, from 4 to 4.5 atom %, from 4.5 to 5 atom %, from 5 to 5.5 atom %, from 5.5 to 6 atom %, from 6 to 6.5 atom %, or any combination of two or more of these ranges. In independent embodiments, the second core alloy may be doped with Gd in a range of from 0 to 0.5 atom %, from 0.5 to 1 atom %, from 1 to 1.5 atom %, from 1.5 to 2 atom %, from 2 to 2.5 atom %, from 2.5 to 3 atom %, or any combination of two or more of these ranges. In independent embodiments, the second core alloy may be doped with A1 in a range of from 0 to 0.5 atom %, from 0.5 to 1 atom %, from 1 to 1.5 atom %, or any combination of two or more of these ranges. In independent embodiments, the second core alloy may be doped with Co in a range of from 0 to 0.5 atom %, from 0.5 to 1 atom %, from 1 to 1.5 atom %, from 1.5 to 2 atom %, from 2 to 2.5 atom %, from 2.5 to 3 atom %, from 3 to 3.5 atom %, from 3.5 to 4 atom %, or any combination of two or more of these ranges. In independent embodiments, the second core alloy may be doped with Cu in a range of from 0 to 0.05 atom %, from 0.05 to 0.1 atom %, from 0.1 to 0.15 atom %, from 0.15 to 0.2 atom %, from 0.2 to 0.25 atom %, from 0.25 to 0.3 atom %, from 0.3 to 0.35 atom %, from 0.35 to 0.4 atom %, from 0.4 to 0.45 atom %, from 0.45 to 0.5 atom %, or any combination of two or more of these ranges. In independent embodiments the second core alloy may be doped with Fe in a range of from 0 to 0.05 atom %, from 0.05 to 0.1 atom %, from 0.1 to 0.15 atom %, from 0.15 to 0.2 atom %, from 0.2 to 0.25 atom %, from 0.25 to 0.3 atom %, from 0.3 to 0.35 atom %, from 0.35 to 0.4 atom %, from 0.4 to 0.45 atom %, from 0.45 to 0.5 atom %, or any combination of two or more of these ranges. In independent embodiments, the second core alloy may be doped with Ga in a range of from 0 to 0.05 atom %, from 0.05 to 0.1 atom %, from 0.1 to 0.15 atom %, from 0.15 to 0.2 atom %, from 0.2 to 0.25 atom %, from 0.25 to 0.3 atom %, or any combination of two or more of these ranges. In independent embodiments, the second core alloy may be doped with Ti in a range of from 0 to 0.01 atom %, from 0.01 to 0.02 atom %, from 0.02 to 0.03 atom %, from 0.03 to 0.04 atom %, from 0.04 to 0.05 atom %, from 0.05 to 0.06 atom %, from 0.06 to 0.07 atom %, from 0.07 to 0.08 atom %, from 0.04 to 0.09 atom %, from 0.09 to 0.1 atom %, from 0.1 to 0.11 atom %, from 0.11 to 0.12 atom %, from 0.12 to 0.13 atom %, from 0.13 to 0.14 atom %, from 0.14 to 0.15 atom %, from 0.15 to 0.16 atom %, from 0.16 to 0.17 atom %, from 0.17 to 0.18 atom %, from 0.18 to 0.19 atom %, from 0.19 to 0.2 atom %, or any combination of two or more of these ranges. In independent embodiments, the second core alloy may be doped with Zr in a range of from 0 to 0.005 atom %, from 0.005 to 0.01 atom %, from 0.01 to 0.015 atom %, from 0.015 to 0.02 atom %, from 0.02 to 0.025 atom %, from 0.025 to 0.03 atom %, from 0.03 to 0.035 atom %, from 0.035 to 0.04 atom %, from 0.04 to 0.045 atom %, from 0.045 to 0.05 atom %, from 0.05 to 0.055 atom %, from 0.055 to 0.06 atom %, from 0.06 to 0.065 atom %, from 0.065 to 0.07 atom %, from 0.07 to 0.075 atom %, from 0.075 to 0.08 atom %, from 0.08 to 0.085 atom %, from 0.085 to 0.09 atom %, from 0.09 to 0.095 atom %, from 0.095 to 0.01 atom %, or any combination of two or more of these ranges.

Preparing Green Bodies

The mixed alloy particles are processed further by (c) compressing the population of mixed alloy particles together to form a green body, under a magnetic field of a suitable strength to align the magnetic particles with a common direction of magnetization in an inert atmosphere. These particles may have designed shapes to facilitate packing of particles within a compact. Shapes include spherical, angular, dendritic, and disc-shaped. A blend of different shaped powder particles may help improve packing efficiency of the mixed alloy powder in the compact. The resulting green body provides a solid body comprising an intimate mixture of the mixed alloy particles. The mixed alloy particles may be compressed into any predetermined shape suitable for the intended use of the final sintered body. These shapes may reflect the final form intended for the sintered bodies, or may require further machining to achieve the final form of the sintered bodies. Typically, cylindrical shapes are preferred. In some embodiments, the mixed alloy particles are compressed in dry form; in other embodiments, a suitable lubricant may be used. Suitable lubricants may comprise fatty acid esters or amides or polyglycols, for example, but must be chosen such that when the green bodies are sintered, there is no or acceptable levels of C, N, or O residues left in the sintered bodies. Such levels of C, N, and/or O are typically individually less than 5000 ppm, 2500 ppm, 1000 ppm, less than 100 ppm, or less than 10 ppm by weight.

As used throughout this disclosure, the term “inert atmosphere” refers to an atmosphere or environment that is substantially absent of oxygen, water, or other oxidizing agents. “Substantially absent” refers either to the absence of deliberately added oxygen, water, or other oxidizing agent, and preferably where best efforts are taken to exclude these materials. Dry nitrogen or argon atmospheres are typically suitable for this purpose.

During the formation of the green body, the compressing is typically done under a compressive force in a range of from about 800 to about 3000 kN, though the methods are not necessarily limited to these force levels, provided the applied forces provide the densities deemed desirable for the final processing and product. In certain independent embodiments, the force is applied on one or more applications, with each application comprising application of a force in a range of 800 to 1000 kN, from 1000 to 1500 kN, from 1500 to 2000 kN, from 2000 to 2500 kN, from 2500 to 3000 kN, or any combination thereof. In some preferred embodiments, the compression is done with the application of a force in a range of from about 1000 kN to about 2500 kN.

Also during the formation of the green body, the materials are subjected to a magnetic field in a range of from about 0.2 T to about 2.5 T (160 to 2000 A/m), or sufficient to align the magnetic particles with a common direction of magnetization. In certain independent embodiments, the magnetic field is applied in at least one range of from 0.2 to 0.5 T, from 0.5 to 1 T, from 1 to 1.5 T, from 1.5 to 2 T, from 2 to 2.5 T, or any combination of two or more of these ranges.

Sintering the Green Bodies

In some embodiments, the present methods further comprise (d) heating the green body to at least one temperature in a range of from about 800° C. to about 1500° C. for a time sufficient to sinter the green body into a sintered body. The ranges for such sintering include those from 800° C. to 850° C., from 850° C. to 900° C., from 900° C. to 950° C., from 950° C. to 1000° C., from 1000° C. to 1050° C., from 1050° C. to 1100° C., from 1100° C. to 1150° C., from 1150° C. to 1200° C., from 1200° C. to 1250° C., from 1250° C. to 1300° C., from 1300° C. to 1350° C., from 1350° C. to 1400° C., from 1400° C. to 1450° C., from 1450° C. to 1500° C., or any number of two or more of these ranges. While the specific sintering conditions depend on the chemical nature and physical form of the particles in the green body (e.g., chemical compositions and particle size), in some embodiments, certain of these compositions can be sintered at temperatures from about 1050 to about 1085° C. for about 1 to 5 hours; typically about 1080° C. for 3.5 hours. In some embodiments, the sintering process is carried out under combination of cycling vacuum and inert gas (e.g., argon) pressure while sintering occurs.

Once formed, the sintered bodies may be further (e) heat treated, so as to anneal, the sintered body in an environment of cycling vacuum and inert gas at a temperature in the range of from about 450° C. to about 600° C.

In other embodiments, the sintered or sintering bodies are magnetized by (f) applying a magnetic field of sufficient strength to achieve final remanence and coercivity as described herein, for example, using a magnetic field in a range of from about 400 kA/m to about 1200 kA/m (0.5 to 1.5 T). Such a magnetic field may be applied during the sintering, after the sintering during annealing, after annealing, or during any two or more of these times.

The Sintered Magnets

Broadly speaking, the structure of the sintered bodies may be described in terms of sintered core shell particles, or grains, held together by a grain boundary composition. Each of these core shell grains may be described in terms of a core, comprising the composition of the second core alloy, surrounded by multiple shells, the shells comprising intermediate alloy compositions formed from the diffusion of the R, Cu, Co, and M elements of the first GBM alloy into the matrix of the second core alloy particles. The grain boundary composition, then, reflects the composition of the first GBM alloy, less any portion of the elements that have migrated from the grain boundaries into the core shell particles or grains.

Such a composition may be seen as forming during the sintering of the unique mixed alloy particles, each of which may be envisioned as comprising a second core alloy "coated" by particles of the first GBM alloy, or during the subsequent ageing/annealing steps of the sintered body. While not intending to be necessarily bound by the correctness of any particular theory, one may envision that, initially, the lower melting GBM alloy distributes itself, substantially homogeneously, around and between the grains of the second core alloy particles. As heating continues, the mobile diffusible elements of the first GBM alloy migrate into the matrices of the second alloy core particles. As such, grain boundaries, especially triple junction grain boundaries, act as depots for the source of the migration of the elements of the first alloy into the second core alloy particles. Since the GBM alloy consists of many elements, the speed of diffusion of individual atoms of elements into the grain is a function of their inherent chemical potentials. Each element thus displays a characteristic mobility into the main $G_2Fe_{14}B$ phase that results in the formation of shells of elements. As such, the grain boundaries tend to reflect the original composition of the first GBM alloy. That is, while the overall composition may be defined in terms of the composition and proportion of the original ingredients, subject to the presence of oxygen, carbon, and nitrogen additives which add or deplete during processing, the placement of these ingredients is subject to change during sintering, by virtue of their migration from the grain boundaries to the grains (and vice versa). The phrase "grain boundaries tend to reflect the original composition of the first GBM alloy" is intended to connote this compositional change attributable to the migration of the elements of the grain boundary into the grains.

As a consequence, in some embodiments, some of the transition metal elements appear both in the shells of the grains and the grain boundary compositions. Or some rare earth elements may occur in the shell(s) and in the grain boundary but not in the grain core. Since the grain boundaries (especially the triple junction grain boundaries) appear to act depots for the migrating or diffusing elements, in these embodiments, the concentration of the migrating or diffusing elements are higher in the grain boundary compositions than in the grains themselves. These concentration differences provide the chemical gradients that force the migration of the elements into the grains. For example, in some embodiments, since the sintered grains and the grain boundary alloys both contain cobalt and copper, the grain boundary is enriched in these elements, relative to their presence in the sintered particles. In related embodiments, the grain boundary alloy comprises cobalt and copper in combined amount of at least 20 weight %, relative to the total composition of the alloy, as measured by EDS and at least three rare earth elements and one transitional element, each not exceeding 10 weight % of the total alloy composition.

Consistent with the diffusion/migration theory described herein, the size of the grain core may depend on the thermal history of the particles or sintered bodies, including the processing of the particles, the sintering, and subsequent annealing steps). Assuming the shells are formed from the inward migration or diffusion of the elements of the first GBM alloy, one would expect that only the central portion of the original second core alloy particle would retain its original compositional character, and that the size of the resulting core would depend on the thermal history of that particle. This core is expected to become smaller with prolonged heat treatment and higher temperatures of such treatment, for a given composition of the grain boundary composition, as more materials migrated inward. The improvements in magnetic performance (see Examples) are consistent with the formation of smaller sized cores of the second core alloy. It is known for example, that smaller grains (domains) of $Nd_2Fe_{14}B$ (e.g., 300 nm) show higher remanence and better overall magnetic characteristics (such as demonstrated here) than do larger grains (e.g., >5 microns). The challenge has been to provide sintered bodies comprising these smaller grains without their forming larger particles during sintering. The present methods appear to provide a means for controllably achieving these smaller $G_2Fe_{14}B$ grains, the grains being separated by the prescribed shells.

Accordingly, it is possible to control the size of the core in these GBE magnets, and embodiments defined by the size of the cores are within the scope of the present disclosure. In some embodiments, the sintered bodies comprise grains having a core of the second core alloy having dimensions in a range of from about 0.3 to about 3.9 microns. In other embodiments, the grain core may have at least one dimension in a range of from 0.3 to 0.4 microns, from 0.4 to 0.5 microns, from 0.5 to 0.6 microns, from 0.7 to 0.8 microns, from 0.8 to 0.9 microns, from 0.9 to 1 micron, from 1 to 1.1 microns, from 1.1 to 1.2 microns, from 1.2 to 1.3 microns, from 1.3 to 1.4 microns, from 0.4 to 0.5 microns, from 1.5 to 1.6 microns, from 1.7 to 0.8 microns, from 1.8 to 1.9 microns, from 1.9 to 2 microns, from 2 to 2.1 microns, from 2.1 to 2.2 microns, from 2.2 to 2.3 microns, from 2.3 to 2.4 microns, from 2.4 to 2.5 microns, from 2.5 to 2.6 microns, from 2.6 to 2.7 microns, from 2.7 to 2.8 microns, from 2.8 to 2.9 microns, from 2.9 to 3 microns, from 3 to 3.1 microns, from 3.1 to 3.2 microns, from 3.2 to 3.3 microns, from 3.3 to 3.4 microns, from 3.4 to 3.5 microns, from 3.5 to 3.6 microns, from 3.7 to 3.7, from 3.7 to 3.8 microns, from 3.8 to 3.9 microns, or any combination of two or more of these ranges, for example from about 0.3 to about 2.3 microns. The skilled artisan would be able to tune the core size of individual compositions by adjusting the processing temperatures described herein, especially the final sintering temperatures. Optimal ranges for any given material may be defined by the optimal domain structure for a given core alloy composition. The thickness of the shells may be less important than the size of the cores, but in some embodiments, the cumulative thickness of the shells is in a range of from about one to three microns, but in some embodiments, the cumulative thickness of the shells is in a range of from about 0.5 to 1, 1 to 1.5, 1.5 to 2.2 to 2.5, 2.5 to 3, 3 to 3.5, 3.5 to 4, 4 to 4.5, 4.5 to 5, or a range defined by any two or more of these ranges.

If the grains were spherical or quasi-spherical, these core dimensions may reflect the diameter of a spherical or quasi-spherical core. For other shaped grains, optimal sizes are those having at least one axis dimension in this range. It may also be convenient to describe the core in terms of proportionality with respect to the shell(s). In some embodiments, the relative proportion of the core dimension to the shell thickness is in a range of from about 1:10 to about 4:1. In other embodiments, the relative proportion of the core dimension to the shell thickness is in a range of from about 1:10 to about 1:8, from 1.8 to about 1:1.6, from about 1:6 to about 1:4, from about 1:4 to about 1:2, from about 1:2 to about 1:1, from about 1:1 to about 2:1, from about 2:1 to about 3:1, from about 3:1 to about 4:1, or a range defined by two or more of these ranges.

Formation of the shell structure and diffusion of heavy rare earths and other elements into each magnetic grains allows for their presence over the entire body of any magnet made with this material, so that high coercivity magnets can be made using minimal Dy, Tb, or other rare earth element, without any limitation of thickness or geometry (see, e.g., Example 3, Table 13). Since the sintered body results from the sintering of chemically homogeneous or substantially homogeneous (as practically possible by solids mixing) mixed alloy particles, the composition of any body so produced (sintered core shell particles and grain boundaries) is substantially constant (for example, with a magnetic property varying by less than 10%, 5%, 4%, 3%, 2%, or 1%) throughout the body. In this regard, the term "substantially constant" refers to the practical absence of composition gradients through the body that would otherwise result from adding additives to one or more surfaces of a previously sintered body. The variances in these gradients are described elsewhere herein. This feature de-limits the size and shapes of the homogeneous magnets so produced, as compared with those magnets produced by other means. That is, the substantial homogeneity of any magnetic material so produced is no longer limited to the diffusion of grain boundary additive to pre-sintered bodies.

Without intending to be bound by the correctness of any particular theory of operation, it appears that the presence of a well-defined, small $G_2Fe_{14}B$ core surrounded by shells is believed to be responsible for the improved localized magneto-crystalline anisotropy. If this is the case, then each of the elements provided by the GBM alloy is believed to provide a specific attribute to the final product. For example, the addition of a transition metal (additive of Cu, Co, Zr, Fe) appears to improve the temperature resistance to magnetization reversal. Introducing Cu at the levels claimed for the GBM additive is believed to result in the formation of copper-rich aggregates within the boundary between the triple pocket junction (grain boundary phase) and $G_2Fe_{14}B/Nd_2Fe_{14}B$ matrix grain at levels sufficient to provide one or both of (i) an increase in the surface energy between the $G_2Fe_{14}B/Nd_2Fe_{14}B$ matrix grain and grain boundary grains and (ii) the formation of a thin layer which inhibits the diffusivity of Dy and Tb into the $Nd_2Fe_{14}B$ matrix grains. Additions of Cu is believed to help to resist embittlement of the final core shell sintered NdFeB product as well as increasing corrosion resistance by forming various copper-rare earth metal oxides.

Without intending to be bound by the correctness of any particular theory of operation, introducing Co at the levels claimed for the GBM additive is believed to lead to the formation of a rare earth-cobalt oxide phase or phases, which may help inhibit the corrosion properties, such that the core shell sintered NdFeB ($G_2Fe_{14}B$ phase) has increased corrosion resistance in the grain boundary phase as well as giving rise to core multi shell structure.

Without intending to be bound by the correctness of any particular theory of operation, the presence of Zr in the GBM alloy is believed to result in an association with any iron also present in the composition, as introduced either in the first or second alloys. If localized in the grain boundaries or outer shells, the associated Zr—Fe alloys may be useful in preventing the propagation of the reverse domains during the demagnetization. The presence of Zr is believed also to induce the ferromagnetic coupling between the grain boundary and the matrix $G_2Fe_{14}B$ phase by varying electron concentration in any such associated Fe—Zn structures. The introduction of Zr on the grain boundary may also help to increase the resistivity in the final core shell sintered NdFeB product.

Without intending to be bound by the correctness of any particular theory of operation, the addition of various rare earth component (Nd, Pr, Dy, Tb) via the GBM additive is believed to also result in the formation of a rare earth rich shell or shells allowing for a reinforcing of magneto crystalline anisotropy around the core. Each of the elements in the GBM additive is expected to have a different diffusivity into the core material. The collective presence of these materials, Nd, Pr, Dy, Tb, Cu, Co, Zr, Fe, in the amounts claimed appear to provide an optimal balance of kinetic and thermodynamic properties for modulating the diffusion of these and other species into the bulk of the grain.

Further, it would be expected that individual bands (shells) of each migrating species would be observed, the relative intensities of which would depend on the diffusivities of the materials into the core under the processing conditions. For example, diffusion of Dy, Tb, Cu, and Co (from a first GBM alloy) into a second $G_2Fe_{14}B$ core alloy material would result in bands of each of these materials within the final grain structure in shells outside of the core, the intensities which depend on their individual (or aggregate) migration kinetics. Where multiple heat treatments are provided, these individual elemental shells may broaden or separate, depending on their localized environments at the time of subsequent heat treatments. Given that these materials would be present, at least initially at the grain boundaries (which act as depots for their subsequent migrations), the diffusion of these materials into the $G_2Fe_{14}B$ core may be modeled as an exponentially decaying periodic trend such as (Co*exp(−x/L)*sin(x/1+c)) where: $C_0$ is the initial concentration of each element at the grain boundary, L is the decay length and 1 is the diffusion wavelength, under the processing conditions.

These GBE magnets are attractive not only because they can be prepared using much lower levels of rare earth elements such as Dy, Tb, Er, than with other methods to achieve similar properties, but because the resulting magnets exhibit comparable or superior properties, even in the face of these reduced Dy levels (see Tables 11-13). Compositions exhibiting such improved properties are also included in the scope of the disclosure. As shown in FIG. 4, such magnets can exhibit increased coercivity (up to 90%), with a minimal loss of remanence. Such materials also exhibit enhanced corrosion resistance, and greater alpha and beta factors, representing a greater resistance to demagnetization. Even further, the GBE magnets described herein provide significant improvements in the reversible coefficients alpha (describing remanence) and beta (describing coercivity), particularly in the case where Dy Tb Co, Cu, Fe, Zr. GBE magnets exhibiting such improved properties are also included in the scope of the present invention. For example, in certain embodiments include those GBE compositions having cores comprising doped or undoped $G_2Fe_{14}B$ (including nominal $Nd_2Fe_{14}$ B, dopant levels described elsewhere herein), comprising heavy rare earth elements (i.e., Dy, Tb, Ho, Er, Tm, Yb, or Lu, but especially Dy) at levels in a range of from 0.2 to 0.3 wt %, from 0.3 to 0.4 wt %, from 0.4 to 0.5 wt %, from 0.5 to 0.6 wt %, from 0.6 to 0.7 wt %, from 0.7 to 0.8 wt %, from 0.8 to 0.9 wt %, from 0.9 to 1.0 wt %, from 1.0 to 1.1 wt %, from 1.1 to 1.2 wt %, from 1.2 to 1.3 wt %, from 1.3 to 1.4 wt %, from 1.4 to 1.5 wt %, from 1.5 to 1.6 wt %, from 1.6 to 1.7 wt %, from 1.7 to 1.8 wt %, from 1.8 to 1.9 wt %, from 1.9 to 2 wt %, or any combination of two or more of these ranges, for example, from 0.1 to 1.3 wt % or 0.8 to 1.3 wt % which independently exhibit Jal values in a range of 0.02 to 0.14 or |0| values of from 0.45 to 0.7 over the temperature range of 80° C. to 200° C., when tested under the conditions described in Example 3.

At the risk of being repetitive, the specific attributes characterizing the sintered body, particularly in the case of compositions specifically directed as having $Nd_2Fe_{14}B$ cores, include:

Grains in a range of from about 3 microns to about 5 microns; the grains characterized having a core and multiple shell layers;

$Nd_2Fe_{14}B$ cores within these grains having a size of 0.3 to about 2.3-2.9 micron;

Multiple shells in which a plurality of individual transition metal (Co, Cu, and M) elements are distributed with a matrix of the second core alloy (in this case, $Nd_2Fe_{14}B$) arranged in periodic shells extending from the grain boundary to the core of each particle;

Grain boundaries being enriched in non-core, GBM alloy material, reflecting higher concentrations of transition metal (Co, Cu, and M) elements; (again, M is at least one transition metal element, exclusive of Cu and Co)

Elements within grain shell layers reflective of elements within the GBM alloy;

Compositions may also be characterized by properties exhibited by the compositions, relative to a comparative composition (having the same grain size and overall elemental composition) but in which the grains of the comparative composition do not possess the concentric shells of the present invention Again, it is stated here for the sake of completeness, this disclosure includes descriptions of the alloys, alloy and mixed-alloy particles, populations of alloy particles, green bodies, sintered bodies and their associated grains and grain boundaries and methods of these articles. Any description attributable to a method is also attributable to the article, and vice versa.

In addition to the sintered magnetic compositions themselves, additional embodiments include those devices incorporating these magnets, such devices intended for use at temperatures in a range of from 80° C. to 200° C. Such devices include head actuators for computer or tablet hard disks, erase heads, magnetic resonance imaging (MRI) equipment, magnetic locks, magnetic fasteners, loudspeakers, headphones or ear pods, mobile telephones and other consumer electronics (e.g., i-pods, electronic watches, ear pods, DVD and blue-ray players, CD and record players, microphones, home appliances), magnetic bearings and couplings, NMR spectrometers, linear and A/C motors, electric motors (for example, as used in cordless tools, servomotors, compression motors, synchronous, spindle and stepper motors, electric and power steering, drive motors for hybrid and electric vehicles), and electric generators (including wind turbines).

Systems

In addition to the structures, methods of making and uses of the inventive materials, the present disclosure also contemplates the systems for making these materials. Again, many of the descriptions provided for the methods of making these core-shell materials are applicable to the description of the systems, and to the extent appropriate, these descriptions are incorporated here.

For example, in homogenizing the first GBM alloy particles and the second core alloy particles, it is convenient to use an apparatus comprising:

(a) an insulated rotatable reactor, said reactor having inlet and outlet ports, each port adapted for respectively adding and removing particles from the rotatable reactor, each inlet and outlet port optionally fitted with a particle sieve;

(b) a vacuum source capable of providing vacuum to the insulated rotatable reactor (c) a heater capable of heating the rotatable reactor during use; and optionally (d) a sampling portal allowing for retrieval of samples during the operation of the apparatus.

While each of these particular elements is known individually, the composite apparatus is not similarly known.

Further, a system comprising such an apparatus may be useful in executing the methods described herein, wherein the system further comprises one or more of:

(a) a rotatable hydrogen reactor capable of treating solid magnetic materials with hydrogen at pressures in a range of from 1 to 10 bar (or, in some embodiments, higher, e.g., to 150 bar);

(b) a rotatable outgassing chamber capable of being evacuated and heated to decrepitate hydrogen-containing magnetic materials;

(c) a jet milling apparatus;

(d) a compression device capable of applying a force in a range of from about 800 to about 3000 kN to a population of particles, the compression device fitted with a source of a magnetic field, the magnetic field source able to provide a magnetic field in a range of from about 0.2 T to about 2.5 T, while the compression device is applying the force to the population of particles; and (e) a sintering chamber configured to provide alternative vacuum and inert atmosphere environments within the chamber while providing an internal temperature to the chamber in a range of from ambient to about 400° C., and further to about 1200° C.

In other embodiments, such systems comprise two, three, four, or five of these aspects (a) through (e).

The following listing of Embodiments is intended to complement, rather than displace or supersede, the previous descriptions. As such, these Embodiments should be read in context of the general description.

Embodiment 1. A method of preparing a sintered magnetic body having improved coercivity and remanence, the method comprising:

(a) homogenizing a first population of particles of a first GBM alloy with a second population of particles of a second core alloy, the weight ratio of the first and second population of particles is in a range of from about 0.1:99.9 to about 16.5:83.5 to form a composite alloy preform; wherein (i) the first GBM alloy is substantially represented by the formula: $AC_bR_xCo_yCu_dM_z$, where (A) AC comprises Nd and Pr in an atomic ratio in a range of from 0:100 to 100:0, and b is a value in a range of from about 5 atom % to about 65 atom %;

(B) R is one or more rare earth element and b is a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 atom % to about 18 atom %; and (G) the sum of b+x+y+d+z is greater than one or more of 95, 96, 97, 98, 99, 99.5, 99.8, or 99.9 atom % to about 99.9 or 100 atom %;

(ii) the second core alloy is substantially represented by $G_2Fe_{14}B$, where G is a rare earth element, and the second core alloy is optionally doped with one or more transition or main group element (including those resulting from the use of virgin or recycled materials);

(b) heating the composite alloy preform to a temperature greater than the solidus temperature of the first alloy but less than the melting temperature of the second core alloy to form a population of discrete mixed alloy particles.

Embodiment 2. A method of preparing a sintered magnetic body having improved coercivity and remanence, the method comprising:

(a) homogenizing a first population of particles of a first Grain Boundary Modifying (GBM) alloy with a second population of particles of a second core alloy, the weight ratio of the first and second population of particles is in a range of from about 0.1:99.9 to about 16.5:83.5 to form a composite alloy preform; wherein the second core alloy is substantially represented by the formula $G_2Fe_{14}B$, where G is a rare earth element; optionally, the second core alloy is doped with one or more transition metal or main group element;

the mean particle diameter of the first population of particles of the first GBM alloy is in a range of from about 1 micron to about 4 microns;

the mean particle diameter of the second population of particles of the second core alloy is in a range of from about 2 microns to about 5 microns; and (b) heating the composite alloy preform to a temperature greater than the solidus temperature of the first alloy but less than the melting temperature of the second core alloy to form a population of discrete mixed alloy particles.

Embodiment 3. The method of Embodiment 2, wherein the first GBM alloy is substantially represented by the formula $Nd_jDy_kCo_mCu_nFe_p$, where j is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition;

k is atomic percent in a range from 1 to 5, 5 to 10, 10 to 15, 15 to 20, 20 to 25, 25 to 30, 30 to 35, 35 to 40, 40 to 45, 45 to 50, 50 to 55, 55 to 60 20 atom % or a range comprising two or more of these ranges, relative to the entire composition;

m is atomic percent in a range from 1 to 5, 5 to 10, 10 to 15, 15 to 20, 20 to 25, 25 to 30, 30 to 35, 35 to 40, 40 to 45, 45 to 50, 50 to 55, 55 to 60 atom % or a range comprising two or more of these ranges, relative to the entire composition;

n is atomic percent in a range from 0.1 to 0.5, 0.5 to 1, 1 to 1.5, 1.5 to 2, 2 to 2.5, 2.5 to 3, 3 to 3.5, 3.5 to 4, 4 to 4.5, 4.5 to 5, 5 to 5.5, 5.5 to 6, 6 to 6.5, 6.5 to 7, 7 to 7.5, 7.5 to 8, 8.5 to 9, 9 to 9.5, 9.5 to 10, 10 to 12, 12 to 14, 14 to 16, 16 to 18, 18 to 20 atom % or a range comprising two or more of these ranges, relative to the entire composition;

p is atomic percent in a range from 1 to 2, 2 to 3, 3 to 4, 4 to 5, 5 to 6, 6 to 7, 7 to 8, 8 to 9, 9 to 10, 10 to 11, 11 to 12, 12 to 13, 13 to 14, 14 to 15, 15 to 16, 16 to 17, 17 to 18, 18 to 19, 19 to 20 atom % or a range comprising two or more of these ranges, relative to the entire composition; and j, k, m, n, and p are independently variable within their stated ranges provided that the sum of j+k+m+n+p is greater than 95, 96, 97, 98, 99, 99.5, 99.8, or 99.9 atom % to about 99.9 atom % or 100 atom %.

Embodiment 4. The method of Embodiment 1 or 2, wherein the homogenizing step (a) is preceded by treating coarse particles of either the first GBM or second core alloy or both the first GBM and second core alloys in the presence of hydrogen under conditions and for a time to allow absorption of the hydrogen into either the first GBM or second core alloy or both the first GBM and second core alloys.

Embodiment 5. The method of any one of Embodiments 1 to 3, wherein the homogenizing step (a) comprising multiple separate mixing steps.

Embodiment 6. The method of any one of Embodiments 1 to 4, wherein the homogenizing step (a) comprising multiple separate mixing steps at least one of which increases the average surface area of at least one, preferably both, of the particle populations.

Embodiment 7. The method of any one of Embodiments 1 or 4 to 6 as applied to Embodiment 1, wherein AC is present in a range of from about 5 atom % to about 15 atom % of the first GBM alloy. In related independent Embodiments, b is a range of from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, or any combination of two or more of these ranges.

Embodiment 8. The method of any one of Embodiments 1 or 4 to 7, as applied to Embodiment 1, wherein the atomic ratio of Nd to Pr in AC is 100:0, 25:75, 50:50, 75:25, or 0:100.

Embodiment 9. The method of any one of Embodiments 1 or 4 to 8, as applied to Embodiment 1, wherein R is Nd, Pr, La, Ce, Gd, Ho, Er, Yb, Dy, Tb, or a combination thereof, preferably Dy and/or Tb. In independent sub-Embodiments, R may comprise 1, 2, 3, 4, 5, 6, 7, or 8 separate rare earth elements, preferably at least 3, 4, 5, 6, 7, or 8 different rare earth elements.

Embodiment 10. The method of any one of Embodiments 1 or 4 to 9, as applied to Embodiment 1, wherein R comprises at least three different rare earth elements, the total representing about 10 atom % to about 60 atom % of the first GBM alloy. In independent Embodiments, and independent of the number of R elements present, x is a range of from 5 to 10 atom %, 10 to 15 atom %, 15 to 20 atom %, 20 to 25 atom %, 25 to 30 atom %, 30 to 35 atom %, 35 to 40 atom %, 40 to 45 atom %, 45 to 50 atom %, 50 to 55 atom %, 55 to 60 atom %, 60 to 65 atom %, 65 to 70 atom %, 70 to 75 atom % or any combination of two or more of these ranges; exemplary, non-limiting, combination ranges include 30 to 60 atom % or 10 to 60 atom %.

Embodiment 11. The method of any one of Embodiments 1 or 4 to 10, as applied to Embodiment 1, wherein Co is present in the first GBM alloy in a range of from about 35 atom % to 45 atom %. In independent Embodiments, y is a range of from 20 to 25 atom %, 25 to 30 atom %, 30 to 35 atom %, 35 to 40 atom %, 40 to 45 atom %, 45 to 50 atom %, 50 to 55 atom %, 55 to 60 atom %, or any combination of two or more of these ranges; exemplary, non-limiting combination ranges include 30 to 40 atom %.

Embodiment 12. The method of any one of Embodiments or 4 to 11 as applied to Embodiment 1, wherein Cu is present in the first GBM alloy in a range of from about 0.01 atom % to 6 atom %. In independent Embodiments, d is a range of from 0.01 to 0.05 atom %, 0.05 to 0.1 atom %, 0.1 to 0.15 atom %, 0.15 to 0.2 atom %, 0.2 to 0.25 atom %, 0.25 to 0.5 atom %, 0.5 to 1 atom %, 1 to 1.5 atom %, 1.5 to 2 atom %, 2 to 2.5 atom %, 2.5 to 3 atom %, 3 to 3.5 atom %, 3.5 to 4 atom %, 4 to 4.5 atom %, 4.5 to 5 atom %, 5 to 5.5 atom %, 5.5 to 6 atom %, 6 to 7 atom %, 7 to 8 atom %, 8 to 9 atom %, 9 to 10 atom %, 10 to 11 atom %, 11 to 12 atom %, 12 to 13 atom %, 13 to 14 atom %, 14 to 15 atom %, or any combination of two or more of these ranges.

Embodiment 13. The method of any one of Embodiments 1 or 4 to 12 as applied to Embodiment 1, wherein M is Ag, Au, Co, Fe, Ga, Mo, Nb, Ni, Ti, V, W, Y, Zr, or a combination thereof. In independent Embodiments, M may comprise 1, 2, 3, 4, 5, 6, 7, 8, 9, 10, 11, 12, or 13 separate transition metal elements, exclusive of Cu and Co, preferably at least 3, 4, 5, 6, 7, 8, 9, 10, 11, or 12 separate transition metal elements, again exclusive of Cu and Co.

Embodiment 14. The method of any one of Embodiments 1 or 4 to 13, as applied to Embodiment 1, wherein M is present in the first GBM alloy in a range of from about 0.01 atom % to 10 atom % In independent embodiments, z is a range of from 0.01 to 0.05 atom %, 0.05 to 0.1 atom %, 0.1 to 0.15 atom %, 0.15 to 0.2 atom %, 0.2 to 0.25 atom %, 0.25 to 0.5 atom %, 0.5 to 1 atom %, 1 to 1.5 atom %, 1.5 to 2 atom %, 2 to 2.5 atom %, 2.5 to 3 atom %, 3 to 3.5 atom %, 3.5 to 4 atom %, 4 to 4.5 atom %, 4.5 to 5 atom %, 5 to 5.5 atom %, 5.5 to 6 atom %, 6 to 7 atom %, 7 to 8 atom %, 8 to 9 atom %, 9 to 10 atom %, 10 to 11 atom %, 11 to 12 atom %, 12 to 14 atom %, 14 to 16 atom %, 16 to 18 atom %, or any combination of two or more of these ranges.

Embodiment 15. The method of any one of Embodiments 1 or 4 to 14, as applied to Embodiment 1, wherein nickel and/or cobalt are present in the first GBM alloy and together account for at least 36 atom % of the total composition of the first GBM alloy.

Embodiment 16. The method of any one of Embodiments 1 or 4 to 15, as applied to Embodiment 1, wherein iron and/or titanium are present in the first GBM alloy and together account for at least 2 atom % up to about 6 atom % of the total composition of the first GBM alloy.

Embodiment 17. The method of any one of Embodiments 1 to 16, wherein G is Nd, Pr, La, Ce, Gd, Ho, Er, Yb, Dy, Tb, or a combination thereof, preferably Nd with or without Pr.

Embodiment 18. The method of any one of Embodiments 1 or 4 to 17 as applied to Embodiment 1, wherein, first GBM alloy comprises of at least neodymium, praseodymium, dysprosium, cobalt, copper, and iron.

Embodiment 19. The method of any one of Embodiments 1 to 18, wherein G is Nd and/or Pr, and the second core alloy is optionally further doped with at least one transition metal or main group.

Embodiment 20. The method of any one of Embodiments 1 to 19, wherein G is Nd and/or Pr, and the second core alloy is further doped with one or more of Dy, Gd, Tb, A1, Co, Cu, Fe, Ga, Ti, or Zr.

Embodiment 21. The method of any one of Embodiments 1 to 20, wherein G is Nd and/or Pr, and the second core alloy is further doped with up to 6.5 atom % Dy, up to 3 atom % Gd, up to 6.5 atom % Tb, up to 1.5 atom % A1, up to 4 atom % Co, up to 0.5 atom % Cu, up to 0.3 atom % Ga, up to 0.2 atom % Ti, up to 0.1 atom % Zr, or combination thereof.

Embodiment 22. The method of any one of Embodiments 1 to 21, wherein the mean particle diameter of the first population of particles of the first GBM alloy is in a range of from about 1 microns to about 4 microns.

Embodiment 23. The method of any one of Embodiments 1 to 22, wherein the mean particle diameter of the second population of particles of the second core alloy is in a range of from about 2 microns to about 5 microns.

Embodiment 24. The method of any one of Embodiments 1 to 23, wherein the mean particle of the population of discrete mixed alloy particles is in a range of from about 2 microns to about 6 microns, preferably 3 to 4 microns.

Embodiment 25. The method of any one of Embodiments 1 to 24, wherein the heating of (b) results in the formation of a population of discrete mixed alloy particles, each particle comprising a core of the second core alloy having a dimension in a range of from about 1 to about 5 microns, and a shell compositionally defined by elements of the first alloy.

Embodiment 26. The method of any one of Embodiments 1 to 25, further comprising: (c) compressing the population of mixed alloy particles together to form a green body, under a magnetic field of a suitable strength to align the magnetic particles with a common direction of magnetization in an inert atmosphere.

Embodiment 27. The method of Embodiment 26, wherein the compressing is done under a force in a range of from about 800 to about 3000 kN, preferably from about 1000 kN to about 2500 kN.

Embodiment 28. The method of Embodiments 26 or 27, wherein the magnetic field is in a range of from about 0.2 T to about 2.5 T or sufficient to align the magnetic particles with a common direction of magnetization.

Embodiment 29. The method of any one of Embodiments 26 to 28, further comprising (d) heating the green body to at least one temperature in a range of from about 800° C. to about 1500° C. for a time sufficient to sinter the green body into a sintered body comprising sintered core shell particles and a grain boundary composition.

Embodiment 30. The method of Embodiment 29, further comprising (e) heat treating (annealing) the sintered body in an environment of cycling vacuum and inert gas at a temperature in the range of from about 450° C. to about 600° C.

Embodiment 31. The method of Embodiments 29 or 30, further comprising (f) applying a magnetic field to the sintering or sintered body of sufficient strength to achieve final remanence and coercivity as described herein, for example, using a magnetic field in a range of from about 400 kA/m to about 1200 kA/m (0.5 to 1.5 T).

Embodiment 32. The method of any one of Embodiments 29 to 31, wherein the sintered particles comprise a core of the second core alloy having a dimension in a range of from about 0.3 to about 2.9 microns.

Embodiment 33. The method of any one of Embodiments 29 to 32, wherein the sintered core shell particles comprise quasi-concentric shells surrounding the core, these shells compositionally defined by shell layers of Co, Cu, and M elements within a matrix of the second core alloy. In some embodiments, the relative proportion of the core diameter to the shell thickness is in a range of from about 1:25 to about 4:1. In other embodiments, the relative proportion of the core diameter to the shell thickness is in a range of from about 1:10 to about 4:1.

Embodiment 34. The method of any one of Embodiments 29 to 33, wherein the grain boundary alloy is enriched in cobalt and copper, relative to their presence in the sintered particles.

Embodiment 35. The method of any one of Embodiments 29 to 34, wherein the grain boundary alloy comprises cobalt and copper in combined amount of at least 20 wt %, relative to the total composition of the alloy, as measured by EDS and at least three rare earth elements and one transitional element, each not exceeding 10 wt % of the total alloy composition.

Embodiment 36. The method of any one of Embodiments 1 to 35, where the overall chemical composition of the alloys or particles are identified by Inductively Coupled Plasma (ICP) analysis.

Embodiment 37. The method of any one of Embodiments 1 to 36, where the overall chemical composition within a particle or within a grain boundary are identified using Energy dispersive X-ray Spectroscopy (EDS) mapping across a fractured or polished surface.

Embodiment 38. A particle or population of particles prepared by a method of any one of Embodiments 1 to 25 or 36. In certain Aspects of this Embodiment, the particle or population of particles is defined in terms of the compositions associated with the methods of preparing, but is not necessarily prepared by these methods.

Embodiment 39. A green body prepared by a method of any one of Embodiments 26 to 28 or 36 to 37. In certain Aspects of this Embodiment, the green body is defined in terms of the compositions associated with the methods of preparing, but is not necessarily prepared by these methods.

Embodiment 40. A sintered body prepared by a method of any one of Embodiments 29 to 37. Such a sintered body may be characterized by its overall structure, including chemical composition and distribution within its grains and grain boundaries and the enhanced performance, relative to structures not having these features. In certain Aspects of this Embodiment, the green body is defined in terms of the compositions associated with the methods of preparing, but is not necessarily prepared by these methods.

Embodiment 41. A device comprising a sintered magnetized body of Embodiment 31, the device selected from a group consisting of head actuators for computer or tablet hard disks, erase heads, magnetic resonance imaging (MRI) equipment, magnetic locks, magnetic fasteners, loudspeakers, headphones or ear pods, mobile telephones and other consumer electronics (such as i-pods, electronic watches, ear pods, DVD and blue-ray players, CD and record players, microphones, home appliances), magnetic bearings and couplings, NMR spectrometers, electric motors (for example, as used in cordless tools, servomotors, compression motors, synchronous, spindle and stepper motors, electric and power steering, drive motors for hybrid and electric vehicles), and electric generators (including wind turbines). In certain Aspects of this Embodiment, the sintered magnetized body is defined in terms of the compositions associated with the methods of preparing, but is not necessarily prepared by these methods.

Embodiment 42. A composition comprising an alloy is represented by the formula: $AC_bR_xCo_yCu_dM_z$, wherein:

(A) AC comprises Nd and Pr in an atomic ratio in a range of from 0:100 to 100:0, and b is a value in a range of from about 5 atom % to about 65 atom %;

(B) R is one or more rare earth element and x is a value in a range of from about 5 atom % to about 75 atom %;

(C) Co is cobalt and Cu is copper;

(D) y is a value in a range of from about 20 atom % to about 60 atom %;

(E) d is a value in a range of from about 0.01 atom % to about 12 atom %;

(F) M is at least one transition metal element, exclusive of Cu and Co, and z is a value in a range of from about 0.01 to about 18 atom %; and (G) b+x+y+d+z is greater than one or more of 95, 98, 99, 99.5, 99.8, or 99.9 atom % to about 99.9 atom % or 100 atom %; and wherein the composition contains less than 0.1 wt % oxygen or carbon. In certain independent Aspects of this Embodiment, the alloy is present as a population of particles having a mean particle diameter in a range of from 0.5 microns to about 5 microns, or any individual or combination of sub-ranges including from 0.5 to 0.8 microns, from 0.8 to 1 micron, from 1 to 2 microns, from 2 to 2.5 microns, from 2.5 to 3 microns, from 3 to 4 microns, or from 4 to 5 microns, or a range combining two or more of these ranges, for example 1 micron to 4 microns.

Embodiment 43. The composition of Embodiment 42, wherein the atomic ratio of Nd to Pr in AC is 100:0, 25:75, 50:50, 75:25, or 0:100, or any ratio therebetween.

Embodiment 44. The composition of Embodiment 42 or 43, wherein R is La, Ce, Gd, Ho, Er, Yb, Dy, Tb, or a combination of two or more of these elements. In certain independent Aspects of this Embodiment, R is a combination of 2, 3, 4, 5, or 6 of La, Ce, Gd, Ho, Er, Yb, Dy, or Tb.

Embodiment 45. The composition of any one of Embodiments 42 to 44, wherein M is Ag, Au, Co, Fe, Ga, Mo, Nb, Ni, Ti, V, W, Y, Zr, or a combination thereof. In certain independent Aspects of this Embodiment, M is y a combination of 2, 3, 4, 5, or 6 of Ag, Au, Co, Fe, Ga, Mo, Nb, Ni, Ti, V, W, Y, or Zr.

Embodiment 46. The composition of any one of Embodiments 42 to 45, wherein the alloy is substantially represented by formula of $(Nd_{0.01\text{-}0.18}\ Pr_{0.01\text{-}0.18}\ Dy_{0.3\text{-}0.5}\ Tb_{0.3\text{-}0.5})_{aa}(Co_{0.85\text{-}0.95}\ Cu_{0.04\text{-}0.15}\ Fe_{0.01\text{-}0.08})_{bb}(Zr_{0.00\text{-}1.00})_{cc}$; wherein:

- aa is a value in a range of from 42 atom % to 75 atom %;
- bb is a value in a range of from 6 atom % to 60 atom %; and
- cc is a value in a range of from 0.01 atom % to 18 atom %;
- provided the combined amount of Nd+Pr is greater than 12 atom %;
- provided the combined amounts of Nd+Pr+Dy+Tb are greater than one or more of 95, 98, 99, 99.5, 99.8, or 99.9 atom % to about 99.9 or 100 atom %;
- provided that the combined amounts of Co+Cu+Fe greater than one or more of 95, 98, 99, 99.5, 99.8, or 99.9 atom % to about 99.9 or 100 atom %; and
- provided that the sum of aa+bb+cc is greater than 0.995 to about 0.999 or 1.

Embodiment 47. The composition of any one of Embodiments 42 to 46, wherein the alloy is described by a stoichiometric formula of $(Nd_{0.16}\ Pr_{0.06}\ Dy_{0.39}\ Tb_{0.39})_{aa}(Co_{0.85}\ Cu_{0.12}\ Fe_{0.03})_{bb}(Zr_{0.62})_{cc}$. Individual variances of any of the parenthetical values may independently be ±0.01, ±0.02, ±0.04, ±0.06±0.0.8, or ±0.1.

Embodiment 48. The composition of any one of Embodiments 42 to 47, wherein the mean particle of the first population of particles of the first GBM alloy is in a range of from about 1 micron to about 4 microns.

Embodiment 49. The composition of any one of Embodiments 42 to 48, the composition being in a form containing columnar and globulite crystals.

Embodiment 50. The composition of any one of Embodiments 42 to 49, the composition being in an amorphous form.

Embodiment 51. The green body of Embodiment 39 or the sintered body of Embodiment 40, wherein the second core alloy is magnetic, paramagnetic, ferromagnetic, antiferromagnetic, superparamagnetic.

Embodiment 52. An apparatus for mixing magnetic particles, the apparatus comprising:

(a) an insulated rotatable reactor, said reactor having inlet and outlet ports, each port adapted for respectively adding and removing particles from the rotatable reactor, each inlet and outlet port optionally fitted with a particle sieve;
(b) a vacuum source capable of providing vacuum to the insulated rotatable reactor;
(c) a heater capable of heating the rotatable reactor during use; and optionally
(d) a sampling portal allowing for retrieval of samples during the operation of the apparatus.

Embodiment 53. A system comprising the apparatus of Embodiment 52, the system further comprising one or more of:

(a) a rotatable hydrogen reactor capable of treating solid magnetic materials with hydrogen at pressures in a range of from 1 to 10 bar;
(b) a rotatable outgassing chamber capable of being evacuated and heated to at least partially outgas the hydrogen-containing magnetic materials;
(c) a jet milling apparatus;
(d) a compression device capable of applying a force in a range of from about 800 to about 3000 kN to a population of particles, the compression device fitted with a source for applying a magnetic field, the magnetic field source able to provide a magnetic field in a range of from about 0.2 T to about 2.5 T, while the compression device is applying the force to the population of particles; and
(e) a sintering chamber configured to provide alternative vacuum and inert atmosphere environments within the chamber while providing an internal temperature to the chamber in a range of from about 400° C. to 1200° C. In other Aspects of this Embodiment, the sintering chamber is fitted with a source for applying a magnetic field. In separate Aspects of this Embodiment, the system comprises 2, 3, 4, or 5 of the elements (a) to (e).

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein. Each of the methods described in the examples may be applied to any composition within the scope of the present disclosure, and the invention is not limited to the application of these methods to the specific compositions described in the Examples.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: Overview of Exemplary Process

In some embodiments, GBE-NdFeB magnets and other magnets described herein can be produced as follows.

The first GBM alloy is based upon the formula $AC_bR_x$-$Co_yCu_dM_z$, and can be produced by a number of techniques described herein. FIG. 3 shows a schematic representation of various embodiments of the processes described here.

In some implementations, large bulk pieces of the GBM alloy were prepared by melting together elements at 1500° C. and pouring the liquid metal into a book mold. Such a casting system is then used to produce a book or cylinder (diameter of 60 mm and length of 200 mm) mold. Other size and shape implementations can be visualized and are also considered within the scope of the disclosure, beyond the specific compositions described for the GBM alloys described here. The cooling speed can vary from 1200° C./min to 1400° C./min.

In some implementations, GBM alloys were also prepared as continuous alloy droplets by solidifying at cooling rates, of about 550° C./sec in jet of inert gas under a 0.2 T magnetic field from melted metals.

GBM alloy can also be strip cast into flakes with dimensions of 5 cm×5 cm×7 cm.

The GBM alloy has also been introduced to strip cast flakes corresponding to a composition of a hard magnetic material in a number of ways, described herein.

In some implementations, strip-cast NdFeB-type flake (with dimensions of 0.2 cm×2-6 cm×2-8 cm, the strip casting providing demagnetized NdFeB-type flake) and GBM alloy (with dimensions of 5 cm×5 cm×7 cm) were partially mixed together with different weight additions, ranging from about 0.1 to about 6.5 weight % in a hydrogen mixing chamber, though the relative proportions of the two alloys is not limited to this value). The thickness distribution of the strip cast flakes was Gaussian with a +/−2.5% standard deviation tolerated around the mean value. The GBM flake initial dimension had a Gaussian distribution as well with a 5% accepted variability across the identified dimensions. Hydrogen was introduced into the chamber at a pressure between 1 to 10 bars and was absorbed by the rare earth containing materials within the chamber. This process of hydrogen absorption was initiated around room temperature (other initial temperatures are clearly possible, but accounting for the exothermic nature of the reaction) and was typically carried out for one to six hours. During the reaction, chamber temperatures typically rose to −80° C. due to the exothermic nature of the reaction. Once the pressure was stable and the temperature returned to ambient, the reaction was considered complete.

In some implementations, the mixed coarse powders were then transferred to another rotating chamber for further mixing under partial vacuum (<210 mbar). The resulting finer powders were then heated to 580° C. for 20 hours, while maintaining a partial vacuum. During the heating process, hydrogen gas was released from the material; the reaction was completed once the pressure stabilized. The resulting mixed powder was discharged from the rotating reactor and passed through a 4-mesh screen. The particles that did not pass through the sieve were returned to the rotating reactor for recycling.

In some implementations, the bulk of the powder, which passed through a 4-mesh screen, was then transferred to a particle homogenizing apparatus and further mixed for 45 to 60 minutes. In some implementations this mixing step occurred for 45 to 60 minutes at about 30 to 60 revolutions per minute, under vacuum or/and in the presence of a protective atmosphere (Argon or Nitrogen). Samples were periodically removed and monitored with an inductively coupled plasma (ICP) analyzer to monitor the composition; if necessary the composition was altered by the addition of extra GBM alloy to the mixing apparatus.

In some implementations, the powder mix was then further homogenized by passing it through a jet milling apparatus using high pressure nitrogen or argon as the carrier gas, while the composition was periodically monitored by ICP. This resulted in a partially homogenized fine powder mixture having an average particle size in a range of from about 1 to about 4.9 micrometers and a particle size in which 99% of the material was able to pass through a 2500 mesh screen. The powders were then transferred back to the particle homogenizing apparatus and mixed for another 45 to 60 minutes under partial vacuum or/and protective gas (Argon or Nitrogen) to achieve the final composition, which was confirmed by ICP. At the end of the last mixing step the powder was characterized using a HELOS (Helium-Neon Laser Optical System) Particle Size Analyzer from Sympatec GmbH. The use of this instrument proved useful for this purpose but other methods may also be envisioned, for example, simple analysis by SEM particle counting. The target properties were an average particle size of less than about 3.8 micrometers for 50% of the powder and less than about 3.9 micrometers for 90% of the powder by volume.

In some implementations, a mold was filled with the fine powder mixture at rate of 5000 grams/minute and a magnetic field was applied in such a way that the magnetic flux throughout the entire mold was 2.3 T. While the field was applied, the powder was pressed by a mechanical ram using a force ranging from about 1000 to about 2500 kN. In some implementations, the final green compact body had a density in a range of from about 4.3 to about 4.9 g/cm$^3$, typically 4.6 g/cm$^3$. In some cases, the oxygen concentration inside the pressing machine was below 200 ppm. The pressing apparatus was controlled by a hydraulic servo technology, which yielded optimum accuracy of the applied force versus the aligning field. This apparatus was controlled by a PLC controller that allowed the press to yield a high degree of magnetic alignment. The weight consistency of the pressed parts was better than ±1 wt %.

In some cases, the green body was then subjected to a sintering heating regime ranging from about 1050 to about 1085° C. for 1-5 hours; typically about 1080° C. for 3.5 hours. In some implementations, the sintering process was carried out under a combination of vacuum and argon pressure while sintering occurred.

In some implementations, this step was followed by an ageing/annealing treatment that kept the green compacted NdFeB type body at a temperature of 800° C. for 1-3 hours, (typically for 2.5 hours) and then at 520° C. for 1-6 hours (typically for 3.5 hours) under a combination of vacuum and argon pressure resulting in a final sintered permanent magnet, herein referred to as a GBE-NdFeB. The oxygen content of NdFeB-based GBE-NdFeB was generally in a range of from about 500 ppm to about 2000 ppm.

Example 2. Properties

Figure 4A:
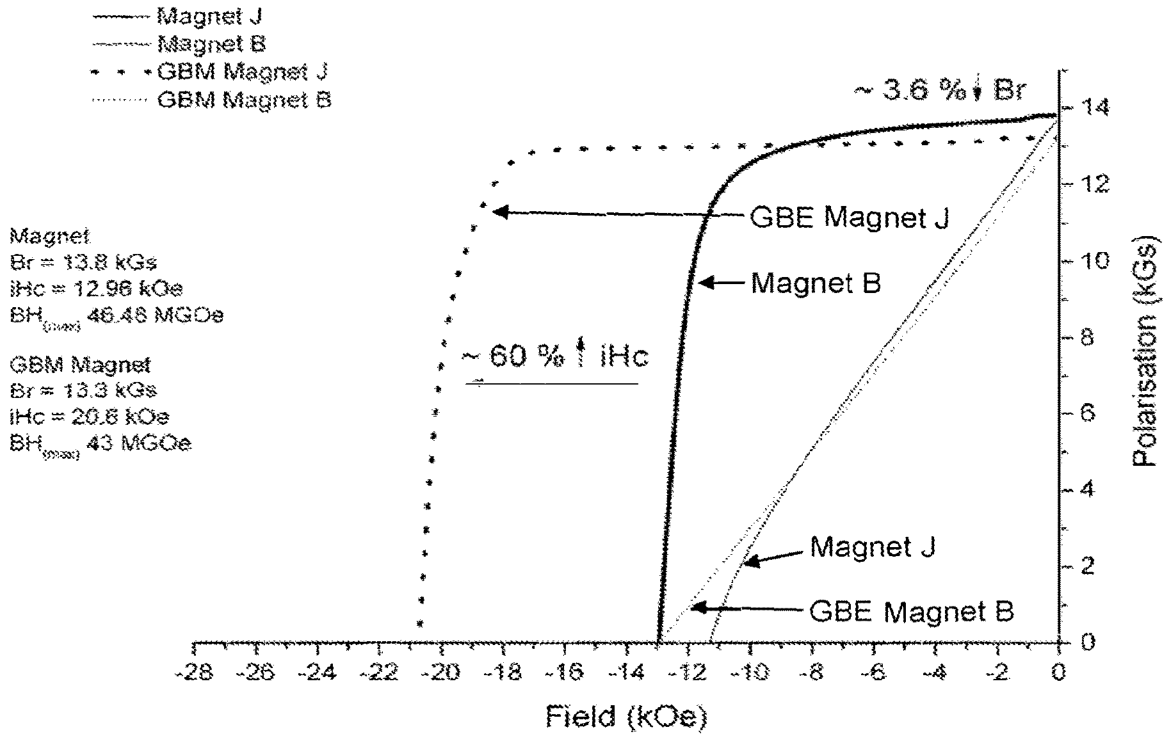
FIGS. 4A-B shows two demagnetization loops for a conventionally sintered strip cast magnet and a GBE-NdFeB magnet, labeled as Magnet and GBE Magnet respectively.
Figure 4B:
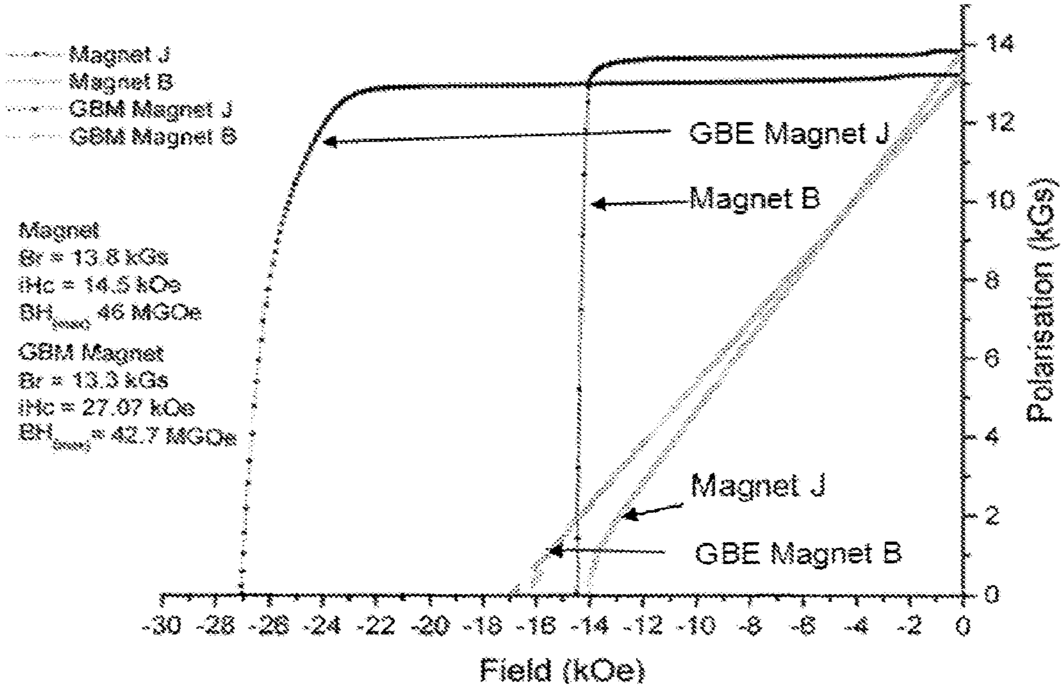

In some implementations, NdFeB based GBE-NdFeB displayed a number of desirable properties, as shown in FIGS. 4A-B. Grain Boundary Engineering resulted in increases in coercivity up to 90%, with a minimal loss of remanence. In addition, NdFeB-based GBE-NdFeB displayed enhanced corrosion resistance, and greater alpha and beta reversible coefficients, representing a greater resistance to demagnetization. FIGS. 4A-B, presents a comparison between two sets of sintered magnets, referred to as the 'Conventional Magnet' and the 'GBE-NdFeB Magnet'. The Conventional Magnet was produced in the conventional way via strip casting using an alloy rich in the $Nd_2Fe_{14}B$ phase. The GBE-NdFeB Magnet was produced from the same starting material from which the Conventional Magnet was manufactured, however importantly contains a GBM alloy addition through the powder blending process described; such that there is a change in composition, as shown in Table 1.

TABLE 1

Changes in elemental composition as a function of additions of a GBM alloy. The information is presented in weight % and was compiled from analyses using an ICP Agilent Technologies 700 Series ICP-OES.

| Element | Strip cast flakes rich in the $Nd_2Fe_{14}B$ phase Starting composition Wt % | Final composition of a GBE-NdFeB magnet End composition Wt % | Absolute change as a result of the GBM-alloy addition % Change |
|---|---|---|---|
| Pr | 5.75 | 5.73 | 0.35 |
| Nd | 23.96 | 23.86 | 0.42 |
| Dy | 0.52 | 1.23 | 136.54 |
| Tb | 0.01 | 0.77 | 7600.00 |
| Co | 0.36 | 0.90 | 150.00 |
| Cu | 0.11 | 0.19 | 72.73 |
| B | 0.94 | 0.93 | 1.06 |
| C | 0.03 | 0.06 | 100.00 |
| O | 0.03 | 0.07 | 133.33 |
| Fe | 68.29 | 66.26 | 2.97 |

In comparing the magnetic properties between these two magnets, only the GBE-NdFeB magnet was able to achieve coercivities higher than 20 kOe. This demonstrated a clear positive effect, whereby the GBM alloy can be used to enhance magnetic performance. See Tables 2-6.

TABLE 2

Comparison of exemplary starting strip cast NdFeB-type flakes (S1), composition of powders (S2 and S3) processed by disclosed methods and difference in percentages between two compositions, using ICP Agilent Technologies 700 Series ICP-OES. Data are in weight % relative to the entire weight of the sample.

| Element | S1 Starting composition, wt % | S2 and S3 Ending composition, wt % | Absolute change between S1 and S2, S3 % Change |
|---|---|---|---|
| Pr | 5.75 | 5.73 | 0.35 |
| Nd | 23.96 | 23.86 | 0.42 |
| Dy | 0.52 | 1.23 | 136.54 |
| Tb | 0.01 | 0.77 | 7600.00 |
| Co | 0.36 | 0.90 | 150.00 |
| Cu | 0.11 | 0.19 | 72.73 |
| B | 0.94 | 0.93 | 1.06 |
| C | 0.03 | 0.06 | 100.00 |
| O | 0.03 | 0.07 | 133.33 |
| Fe | 68.29 | 66.26 | 2.97 |

TABLE 3

Elemental composition of grain boundary phase that was added to strip cast flakes, all values are in atom %, as determined using ICP Agilent Technologies 700 Series ICP-OES

| Alloy | A1 | A2 | A3 | A4 | A5 | A6 | A7 | A8 | A9 |
|---|---|---|---|---|---|---|---|---|---|
| PrNd | 0 | 11.86 | 0 | 0 | 24.86 | 0 | 0 | 0 | 12 |
| Nd | 11.86 | 0 | 9.28 | 8.89 | 0 | 8.89 | 9.080 | 0 | 0 |
| Pr | 0 | 0 | 3.1 | 2.97 | 0 | 02.97 | 3.02 | 12 | 0 |
| Dy | 21.06 | 42.6 | 44 | 42.6 | 29.3 | 42.7 | 42.6 | 42.2 | 42.1 |
| Tb | 21.54 | 0 | 0 | 0 | 0 | 0 | 0.482 | 1.99 | 0 |
| Co | 38.21 | 38.21 | 38.1 | 38.21 | 38.21 | 38.21 | 38.21 | 38 | 38.1 |
| Cu | 5.32 | 5.32 | 3 | 5.32 | 5.01 | 5 | 4 | 3 | 4.08 |
| Zr | 0 | 0 | 0.5 | 0.05 | 0.2 | 0.1 | 0.1 | 0.2 | 1.0 |
| V | 0 | 0 | 0 | 0 | 0.1 | 0.1 | 0.2 | 0.2 | 0.2 |
| Ga | 0 | 0 | 0 | 0 | 0.1 | 0.1 | 0.1 | 0.2 | 0.2 |
| Ti | 0 | 0 | 0 | 0 | 0.1 | 0.1 | 0.1 | 0.1 | 0.2 |
| Nb | 0 | 0 | 0 | 0 | 0.1 | 0.1 | 0.1 | 0.1 | 0.2 |
| C | 0.001 | 0.001 | 0.001 | 0.001 | 0.001 | 0.001 | 0.001 | 0.001 | 0.001 |
| O | 0.001 | 0.001 | 0.001 | 0.001 | 0.001 | 0.001 | 0.001 | 0.001 | 0.001 |
| Fe | 2.008 | 2.008 | 2.018 | 1.958 | 2.018 | 1.728 | 2.006 | 2.008 | 1.92 |

TABLE 4

Elemental composition of strip cast flakes, used for magnet and GBE magnet production all values are in weight %, as determined using ICP Agilent Technologies 700 Series ICP-OES.

| Alloy | PrNd | Dy | Tb | Ga | Gd | Co | Fe | B | Al | Cu | Ti | Zr |
|---|---|---|---|---|---|---|---|---|---|---|---|---|
| B1 | 27.00 | 5.00 | — | 0.10 | — | 1.00 | 64.48 | 1.00 | 1.20 | 0.15 | 0.05 | 0.02 |
| B2 | 27.70 | 4.10 | — | 0.10 | — | 1.00 | 65.8 | 1.00 | 0.20 | 0.1 | | |
| B3 | 26.70 | 3.20 | 0.8 | 0.10 | — | 1.00 | 66.68 | 1.00 | 0.20 | 0.18 | 0.10 | 0.04 |
| B4 | 28.01 | 2.70 | 0.3 | 0.10 | 0 | 1.00 | 66.40 | 1.00 | 0.20 | 0.15 | 0.10 | 0.04 |
| B5 | 28.25 | 3.00 | 0 | 0 | 0 | 1 | 66.21 | 1.025 | 0.225 | 0.15 | 0.10 | 0.04 |
| B6 | 28.3 | 2.20 | 0 | 0 | — | 1 | 67.06 | 1 | 0.15 | 0.15 | 0.10 | 0.04 |

TABLE 4-continued

Elemental composition of strip cast flakes, used for magnet and GBE magnet production all values are in weight %, as determined using ICP Agilent Technologies 700 Series ICP-OES.

| Alloy | PrNd | Dy | Tb | Ga | Gd | Co | Fe | B | Al | Cu | Ti | Zr |
|---|---|---|---|---|---|---|---|---|---|---|---|---|
| B7 | 30.3 | 1 | — | 0.10 | — | 1 | 66.23 | 0.95 | 0.2 | 0.15 | 0.05 | 0.02 |
| B8 | 29.77 | 1.05 | — | 0.20 | — | 1 | 66.65 | 0.91 | 0.2 | 0.15 | 0.05 | 0.02 |
| B9 | 26 | 0.01 | — | — | — | 0.5 | 72.29 | 0.91 | 0.1 | 0.1 | 0.05 | 0.04 |

TABLE 5

Magnetic characteristics of NdFeB-type sintered magnets

| GBE Magnet | Br (kGs) | iHc (kOe) | $BH_{(max)}$ MGOe | $BH_{(max)}$ (kJ/m$^3$) | Sintering Temp (° C.) | Core size (micron) | Alloy A: Alloy B Weight ratio [1] |
|---|---|---|---|---|---|---|---|
| C1 | 11.23 | ≥30 | 30.7 | 244 | 1085 | 1.5 | A1:B1 (6.5:93.5) |
| C2 | 13.02 | 25.55 | 41.01 | 320 | 1080 | 1.2 | A2:B2 (5.5:94.5) |
| C3 | 12.61 | 27.33 | 38.75 | 308 | 1075 | 1.1 | A3:B3 (5.0:95.0) |
| C4 | 12.82 | 27.22 | 40.52 | 315 | 1070 | 1.0 | A4:B4 (4.7:95.3) |
| C5 | 12.92 | 22.78 | 40.82 | 325 | 1075 | 1.05 | A5:B5 (3.0:97.0) |
| C6 | 13.31 | 21.34 | 43.21 | 344 | 1075 | 0.95 | A6:B6 (2.5:97.5) |
| C7 | 13.42 | 19.92 | 43.77 | 348 | 1075 | 0.7 | A7:B7 (2.0:98.0) |
| C8 | 13.54 | 19.82 | 44.81 | 357 | 1081 | 0.85 | A8:B8 (1.7:98.3) |
| C9 | 14.93 | 16.11 | 54.44 | 433 | 1069 | 0.67 | A9:B9 (0.7:99.5) |

[1] Compositions of Alloy A and Alloy B provided in Table 3 and Table 4, respectively

TABLE 6A

Magnetic characteristic of magnets made directly from strip casted flakes; compositions provided in Table 6B.

| Magnet | Br (kGs) | iHc (kOe) | $BH_{(max)}$ MGOe | $BH_{(max)}$ (kJ/m$^3$) | Sintering Temp (° C.) | Grain size (micron) |
|---|---|---|---|---|---|---|
| D1 | 11.91 | 26.62 | 35 | 280 | 1085 | 8.6 |
| D2 | 13.21 | 19.64 | 42 | 340 | 1078 | 7.9 |
| D4 | 13.01 | 21.07 | 41 | 325 | 1070 | 5.8 |
| D5 | 13.22 | 17.68 | 42 | 341 | 1073 | 5.7 |
| D6 | 13.72 | 16.4 | 46 | 367 | 1073 | 4.9 |
| D7 | 13.81 | 14.52 | 46 | 372 | 1072 | 4.7 |
| D8 | 13.96 | 15 04 | 47 | 381 | 1075 | 4.5 |
| D9 | 14.98 | 10.71 | 54 | 432 | 1078 | 4.2 |

To further demonstrate beneficial effects that the GBM alloy can have on magnetic properties, a comparative flux ageing test was performed at various temperatures ranging from 20-200° C. on magnetic materials with and without the recited GBM alloy addition. Two comparative samples were measured for magnetic flux by heating the sintered magnet body to various target temperatures and maintaining this target temperature for two and half hours while measuring the magnetic flux; after this measurement the temperature was increased for the next data point. The magnetic characteristics of the samples are shown in table format in Table 7 and Table 8. The results show the GBE-NdFeB magnet can have superior magnetic performance at elevated temperature with minor decreases in flux. The conventional magnet in this comparison decreases more than 20% in flux at 120° C.

TABLE 6B

Elemental composition of sintered magnets (D1 to D9), used for magnet and GBE magnet production; all values are in weight %, as determined using ICP Agilent Technologies 700 Series ICP-OES.

| | D1 | D2 | D3 | D4 | D5 | D6 | D7 | D8 | D9 |
|---|---|---|---|---|---|---|---|---|---|
| PrNd | 26.80 | 27.50 | 26.45 | 27.93 | 27.95 | 28.11 | 29.90 | 29.67 | 25.80 |
| Dy | 4.90 | 4.00 | 3.11 | 2.64 | 2.87 | 1.93 | 0.95 | 1.01 | 0.01 |
| Tb | — | — | 0.75 | 0.27 | 0.01 | 0.02 | — | — | — |
| Ga | 0.10 | 0.10 | 0.10 | 0.10 | 0.00 | 0.00 | 0.10 | 0.20 | — |
| Gd | — | — | — | 0.00 | 0.00 | — | — | — | — |
| Co | 1.00 | 1.05 | 1.02 | 1.03 | 1.05 | 1.09 | 1.04 | 0.99 | 0.55 |
| Fe | 64.78 | 65.90 | 66.98 | 66.41 | 66.46 | 67.28 | 66.48 | 66.72 | 72.29 |
| B | 1.00 | 1.00 | 1.00 | 1.00 | 1.02 | 1.03 | 0.97 | 0.98 | 0.94 |
| Al | 0.20 | 0.25 | 0.26 | 0.29 | 0.28 | 0.19 | 0.27 | 0.19 | 0.14 |
| Cu | 0.15 | 0.20 | 0.19 | 0.17 | 0.21 | 0.21 | 0.16 | 0.14 | 0.13 |
| Ti | 0.05 | — | 0.11 | 0.11 | 0.13 | 0.10 | 0.09 | 0.07 | 0.08 |
| Zr | 0.02 | — | 0.03 | 0.05 | 0.02 | 0.04 | 0.04 | 0.03 | 0.06 |

while the GBE-NdFeB decreases less than 1%, demonstrating that high temperature stability can be increased by the addition of the GBM alloy.

Table 7A shows data for flux ageing experiments, comparing the conventional sintered NdFeB based magnet and a GBE-NdFeB magnet, compositions described in Table 7B. Measurements were made using a Helmholtz coils (model number HMZ 90540, made by Shanghai Hengtong HT magnet Company).

TABLE 7A

Flux ageing test (2 hours hold times) comparing the high temperature flux losses between a conventional magnet and a GBE-NdFeB magnet (Table 7B). Measurements were made using a Helmholtz coils.

| Item | 20° C. mWb | 80° C. mWb | 120° C. mWb | 140° C. mWb | 160° C. mWb | 180° C. mWb | 200° C. mWb |
|---|---|---|---|---|---|---|---|
| GBE-NdFeB magnet | 2.83 | 2.82 | 2.81 | 2.8 | 2.78 | 2.70 | 2.62 |
| GBE-NdFeB magnet | 2.80 | 2.7 | 2.78 | 2.76 | 2.75 | 2.68 | 2.55 |
| GBE-NdFeB magnet | 2.83 | 2.82 | 2.81 | 2.79 | 2.77 | 2.69 | 2.53 |
| Conventional Magnet | 7.58 | 7.32 | 6.09 | 5.29 | 4.97 | 4.13 | 3.34 |
| Conventional Magnet | 7.58 | 7.32 | 6.07 | 5.3 | 4.97 | 4.18 | 3.29 |
| Conventional Magnet | 7.59 | 7.33 | 6.07 | 5.31 | 5 | 4.25 | 3.32 |

Averaged change in Magnetic flux (%)

| | 20° C. | 80° C. | 120° C. | 140° C. | 160° C. | 180° C. | 200° C. |
|---|---|---|---|---|---|---|---|
| GBE-NdFeB magnet | 2.69 | 1.50 | 0.74 | 1.36 | 1.98 | 4.83 | 9.42 |
| Conventional Magnet | 7.45 | 3.49 | 20.22 | 30.63 | 34.93 | 45.57 | 57.24 |

TABLE 7B

Elemental composition of strip cast flakes, used for magnet and GBE magnet production characterized in Table 7A and Table 8; all values are in weight %, as determined using ICP Agilent Technologies 700 Series ICP-OES.

| | Conventional Magnet | GBE NdFeB Magnet |
|---|---|---|
| PrNd | 28.11 | 28.30 |
| Dy | 1.93 | 1.63 |
| Tb | 0.02 | 0.02 |
| Ga | 0.00 | 0.07 |
| Gd | — | 0.02 |
| Co | 1.09 | 0.77 |
| Fe | 67.05 | 67.49 |
| B | 1.03 | 0.96 |
| Al | 0.19 | 0.30 |
| Cu | 0.21 | 0.16 |
| Ti | 0.10 | 0.01 |
| Zr | 0.04 | 0.07 |
| O | 0.15 | 0.14 |
| C | 0.08 | 0.06 |

Table 8 shows resistivity and conductivity measurement information on a conventional sintered NdFeB based magnet and a GBE-NdFeB magnet. In comparing measurements, it is possible to see that the GBM alloy can modify the resistance and conductivity of strip cast material based on $Nd_2Fe_{14}B$. In this example, the resistivity increases and the conductivity decreases by the introduction of the GBM alloy. Electrical measurements were made using an HP 4192A LF Impedance Analyzer.

TABLE 8

Comparative electrical measurements, showing a comparative example between the conductivity and resistivity for a conventional magnet and a GBE-NdFeB magnet. Measurements were made using a HP 4192A LF Impedance Analyzer. The sample compositions are those described above in Tables 7A and 7B.

| Sample | Conductivity (S/m) | Resistivity (ohm m) |
|---|---|---|
| Conventional Magnet | $62.50 \times 10^4$ | $1.60 \times 10^{-6}$ |
| GBE-Magnet | $58.14 \times 10^4$ | $1.72 \times 10^{-6}$ |

Figure 5:
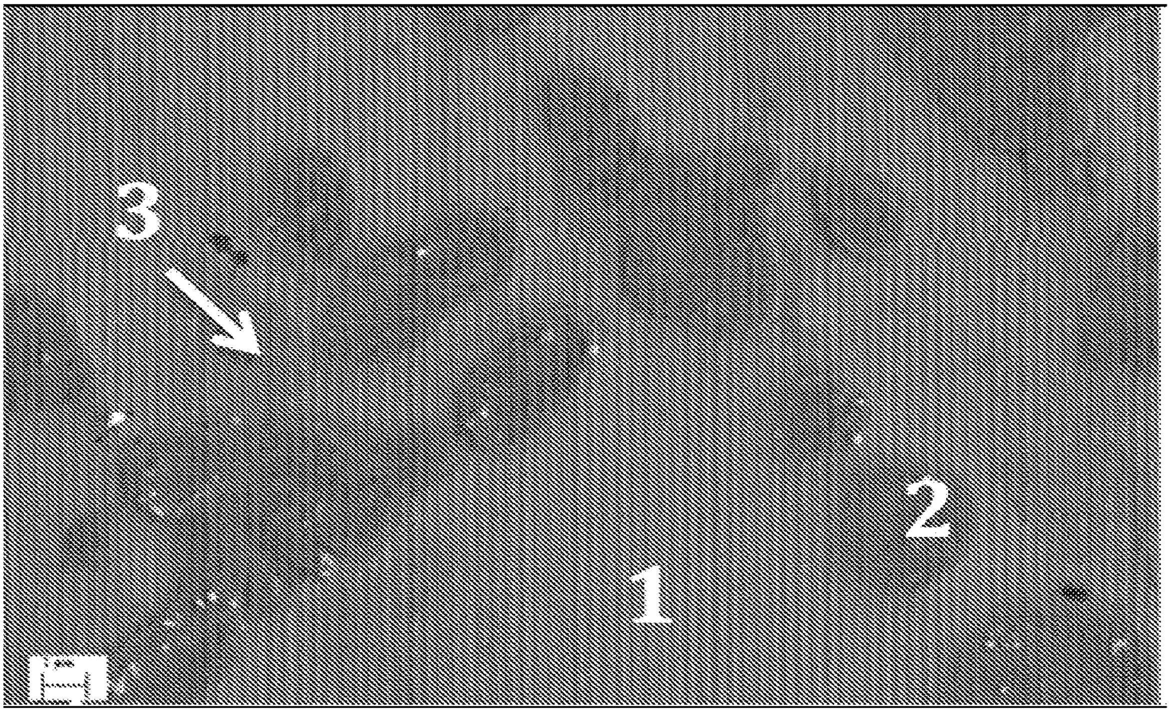
FIG. 5 shows a backscattered SEM image of a GBM Alloy, based on the composition of Nd 8.93%, Pr 3.05%, Dy 21.13%, Tb 21.60%, Co 38.33%, Cu 5.33% Fe 1.28%, and Zr 0.62% by atom percent, the different contrast levels show the GBM Alloy to consist of multiple phases. See Table 10 for explanations of phases 1, 2, and 3.

FIG. 5 shows an example of the microstructure of induction cast GBM alloy based on the previous methods, where a cross section was prepared by metallographic sectioning and polishing. The microstructure shown was captured using a scanning electron microscope (SEM) in the back scattered electron imaging mode. The resulting microstructure shows that the GBM alloy consists of multiple phases that appear in the SEM image as various levels of contrast. In this example the GBM additive was prepared using a 50 kg melt, based on the composition Nd 8.93%, Pr 3.05%, Dy 21.30%, Tb 21.16%, Co 38.33%, Cu 5.33% Fe 1.28%, Zr 0.62% by atom percent. The specific chemical compositions of the areas marked 1, 2, and 3 are shown in Table 9.

TABLE 9

| Chemical compositions of phases from FIG. 5, values in atom % | | | | | | | | |
|---|---|---|---|---|---|---|---|---|
| Phase | Co | Nd | Tb | Dy | Pr | Cu | Fe | Zr |
| Matrix-1 | 30.60 | 13.70 | 25.50 | 23.30 | 0.10 | 4.50 | 1.90 | 0.40 |
| Dark Phase-2 | 55.20 | 1.03 | 13.00 | 19.60 | 0.37 | 1.40 | 8.70 | 0.70 |
| Gray Phase-3 | 24.85 | 10.00 | 18.40 | 19.10 | 23.25 | 21.60 | 2.20 | 0.60 |

Example 3. Reversible Magnetic Losses

Specimens were put into the permeameter where remanence and coercivity were measured at room temperature. Then temperature was raised and the specimens were held at each temperature stage for 5 minutes before measurement. At each stage Br and iH were measured again. The reversible loss coefficient α and β as defined by the following known equations where then computed:

$$\alpha\left(\frac{\%}{°C}\right) = \{[B(T_1) - B'(T_0)]/[B'(T_0)\,dT]\}x100\% \quad (1)$$

$$\beta\left(\frac{\%}{°C}\right) = \{[iH(T_1) - iH'(T_0)]/[iH'(T_0)\,dT]\}x100\% \quad (2)$$

In the equations, B $(T_1)$ and $iH(T_1)$ are, respectively, remanence and intrinsic coercivity at temperature $T_1$ wheras $B'(T_0)$ and $iH(T_0)$ are remanence and intrinsic coercivity at the starting temperature $T_0$ but taken after cooling the specimens down.

In absolute terms the Grain Boundary Engineering process provided GBE magnets that exhibit better (lower) (a) in the range from 80° C. to 160° C., when compared to conventional magnet, with the improvement ranging from 70.2% at 80° C. to 16% at 160° C. (Tables 10-12). Note also that these improvements were observed despite the GBE magnet compositions having significantly lower Dy content (as much as 57.8 atom % less). In these experiments, the conventional magnets exhibited better performance above 180° C., which may have been due to the presence of up to 75% more Dy when compared to GBE magnets (see Table 12).

TABLE 10

Dy content and reversible loss coefficient comparison between GBE and conventional magnets. GBM composition provided in Table 11. Compositions of D1, D2, D4, D5, and D6 provided in Table 6A

| | | Dy Content | GBE NdFeB Magnet | |
|---|---|---|---|---|
| Temp, ° C. | Composition | wt % | \|α\| | \|β\| |
| 80 | GBE | 1.211 | 0.03 | 0.67 |
| 120 | GBE | 1.211 | 0.07 | 0.59 |
| 140 | GBE | 1.211 | 0.09 | 0.56 |
| 160 | GBE | 1.211 | 0.09 | 0.52 |
| 180 | GBE | 1.211 | 0.11 | 0.50 |
| 200 | GBE | 1.211 | 0.12 | 0.48 |
| | | Dy Content | Conventional Magnet | |
| Temp | Composition | wt % | \|α\| | \|β\| |
| 80 | D6 | 1.93 | 0.11 | 0.85 |
| 120 | D4 | 2.64 | 0.12 | 0.75 |

TABLE 10-continued

Dy content and reversible loss coefficient comparison between GBE and conventional magnets. GBM composition provided in Table 11. Compositions of D1, D2, D4, D5, and D6 provided in Table 6A

| | | | | |
|---|---|---|---|---|
| 140 | D5 | 2.87 | 0.11 | 0.60 |
| 160 | D5 | 2.87 | 0.11 | 0.60 |
| 180 | D2 | 4.00 | 0.10 | 0.55 |
| 200 | D1 | 4.90 | 0.09 | 0.50 |

TABLE 11

Elemental composition of GBE magnets used in reversible loss coefficient measurements; values are in weight %, as determined using ICP Agilent Technologies 700 Series ICP-OES.

| Element | GBE NdFeB Magnet |
|---|---|
| Nd | 23.64 |
| Dy | 1.21 |
| Pr | 5.63 |
| Fe | 66.22 |
| Ga | 0.02 |
| Tb | 0.7 |
| Zr | 0.15 |
| Al | 0.47 |
| Co | 0.83 |
| Cu | 0.18 |

TABLE 12

% Dy content change between GBE and conventional magnets and effect on reversible loss coefficients. % Changes relative to GBE composition. GBE composition provided in Table 11. Compositions of D1, D2, D4, D5, and D6 provided in Tables 6A and 10.

| Temp | Grade * | % Change of Dy in GBEs [a] | % Change in \|α\| in GBEs | % Change in \|β\| in GBEs |
|---|---|---|---|---|
| 80 | D6 | −37.3% | −70.2% | −21.3% |
| 120 | D4 | −54.1% | −40.9% | −21.8% |
| 140 | D5 | −57.8% | −22.6% | −7.1% |
| 160 | D5 | −57.8% | −16.1% | −13.4% |
| 180 | D2 | −69.7% | +6.7% | −8.6% |
| 200 | D1 | −75.3% | +33.4% | −4.9% |

[a] Calculated as (wt % GBE − wt % conventional)/(wt % conventional)
[b] Calculated as (|α| GBE − |α| conventional)/(|α| conventional)
[c] Calculated as (|β| GBE − |β| conventional)/(|β| conventional)

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

Each patent, patent application, and publication cited or described in this document is hereby incorporated herein by reference, each in its entirety, for all purposes.

What is claimed:

1. A sintered body or a device comprising a GBM alloy represented by the formula ($Nd_{0.01\text{-}0.18}$ $Pr_{0.01\text{-}0.18}$ $Dy_{0.3\text{-}0.5}$ $Tb_{0.3\text{-}0.5}$)aa ($Co_{0.85\text{-}0.95}$ $Cu_{0.04\text{-}0.15}$ $Fe_{0.01\text{-}0.08}$)bb ($Zr_{0.00\text{-}1.00}$) cc; wherein:

(i) aa is a value in a range of from 42 atom % to 75 atom %;

(ii) bb is a value in a range of from 6 atom % to 60 atom %; and (iii) cc is a value in a range of from 0.01 atom % to 18 atom %;

wherein the combined amount of Nd+Pr is greater than 12 atom %;

wherein, within aa, the combined amounts of Nd+Pr+Dy+Tb is from about 95 atom % to about 100 atom %;

wherein, within bb, the combined amounts of Co+Cu+Fe is from about 95 atom % to about 100 atom %; and wherein aa+bb+cc is from about 0.995 to about 1.

2. The sintered body or device of claim 1, wherein:

the atomic ratio of Nd to Pr is 100:0, 25:75, 50:50, 75:25, or 0:100.

3. The sintered body or device of claim 1, wherein the alloy is described by a stoichiometric formula of $(Nd_{0.16} Pr_{0.05} Dy_{0.392} Tb_{0.40})_{aa} (CO_{0.86} Cu_{0.12} Fe_{0.02})_{bb} (Zr_{1.00})_{cc}$.

4. The sintered body or device of claim 1, wherein:

a mean particle diameter of a first population of particles of the GBM alloy is in a range of from 1 micron to 4 microns; or the sintered body or device comprises a composition in a form containing columnar and globulite crystals; or the sintered body or device comprises a composition in an amorphous form.

5. The sintered body or device of claim 1, wherein the GBM alloy is magnetic, paramagnetic, ferromagnetic, antiferromagnetic, or superparamagnetic.

6. The sintered body or device of claim 1, wherein the sintered body or device is selected from a group consisting of head actuators for computer or tablet hard disks, erase heads, magnetic resonance imaging (MRI) equipment, magnetic locks, magnetic fasteners, loudspeakers, headphones or ear pods, mobile telephones and other consumer electronics, magnetic bearings and couplings, NMR spectrometers, electric motors (for example, as used in cordless tools, servomotors, compression motors, synchronous, spindle and stepper motors, electric and power steering, drive motors for hybrid and electric vehicles), and electric generators (including wind turbines).

7. The sintered body or device of claim 1, wherein the sintered body is a magnet.

8. The sintered body or device of claim 7, wherein the magnet is an Nd—B—Fe magnet.

9. The sintered body or device of claim 1, wherein the sintered body or device comprises a second core alloy represented by the formula $G_2Fe_{14}B$, where G is a rare earth element, the second core alloy optionally doped with one or more transition metal or main group element.

10. The sintered body or device of claim 9, wherein G is Nd, Pr, La, Ce, Gd, Ho, Er, Yb, Dy, Tb, or a combination thereof.

11. The sintered body or device of claim 9, wherein G is Nd and/or Pr, and the second core alloy is further doped with at least one transition metal or main group element.

12. The sintered body or device of claim 9, wherein G is Nd and/or Pr, and the second core alloy is further doped with one or more of Dy, Gd, Tb, Al, Co, Cu, Fe, Ga, Ti, or Zr.

13. The sintered body or device of claim 9, wherein G is Nd and/or Pr, and the second core alloy is further doped with up to 6.5 atom % Dy, up to 3 atom % Gd, up to 6.5 atom % Tb, up to 1.5 atom % Al, up to 4 atom % Co, up to 0.5 atom % Cu, up to 0.3 atom % Ga, up to 0.2 atom % Ti, up to 0.1 atom % Zr, or combination thereof.

14. The sintered body or device of claim 1, wherein: a mean particle diameter of a first population of particles of the GBM alloy is in a range of from 1 micron to 4 microns; or a mean particle diameter of a second population of particles of a second core alloy is in a range of from 2 microns to 5 microns.

15. The sintered body or device of claim 1, comprising a population of discrete mixed alloy particles, each particle comprising a core of a second core alloy having a dimension in a range of from 1 to 5 microns, and a shell compositionally defined by elements of the GBM alloy; and wherein a mean particle diameter of the population of discrete mixed alloy particles is in a range of from 2 microns to 6 microns.

16. The sintered body or device of claim 1, comprising a population of discrete mixed alloy particles, each particle comprising a core of a second core alloy having a dimension in a range of from 1 to 5 microns, and a shell compositionally defined by elements of the GBM alloy; and wherein a mean particle diameter of the population of discrete mixed alloy particles is in a range of from 0.3 to 2.9 microns.

17. The sintered body or device of claim 15, wherein the sintered core shell particles further comprise quasi-concentric shells surrounding the core, these shells compositionally defined by shell layers of Co, Cu, and M elements within a matrix of the second core alloy.

18. The sintered body or device of claim 16, wherein the sintered core shell particles further comprise quasi-concentric shells surrounding the core, these shells compositionally defined by shell layers of Co, Cu, and M elements within a matrix of the second core alloy.

19. The sintered body or device of claim 11, wherein:

the GBM alloy is enriched in cobalt and copper, relative to their presence in the sintered particles; or the GBM alloy comprises cobalt and copper in combined amount of at least 20 wt %, relative to the total composition of the alloy, as measured by EDS and at least three rare earth elements and one transitional element, each not exceeding 10 wt % of the total alloy composition.

20. The sintered body or device of claim 1, where the overall chemical composition is identified by ICP.

21. The sintered body or device of claim 1, where the overall chemical composition within a particle or within a grain boundary are identified using EDS mapping across a fractured or polished surface.

* * * * *